United States Patent [19]

Uchida

[11] Patent Number: 5,787,075
[45] Date of Patent: Jul. 28, 1998

[54] SWITCHED MULTI-MEGABIT DIGITAL SERVICE SWITCHING APPARATUS

[75] Inventor: Yoshihiro Uchida, Kawasaki, Japan

[73] Assignee: Fujitsu Limited, Kanagawa, Japan

[21] Appl. No.: 600,044

[22] Filed: Feb. 12, 1996

[30] Foreign Application Priority Data

May 31, 1995 [JP] Japan .................. 7-134479

[51] Int. Cl.⁶ .................. H04L 12/50; H04Q 11/00
[52] U.S. Cl. .................. 370/252; 370/351; 370/395
[58] Field of Search .................. 370/395, 401, 370/402, 407, 408, 409, 410, 394, 351–356, 241, 242, 252

[56] References Cited

U.S. PATENT DOCUMENTS

| | | | |
|---|---|---|---|
| 5,060,228 | 10/1991 | Tsutsui et al. | 370/402 |
| 5,119,369 | 6/1992 | Tanabe et al. | 370/395 |
| 5,515,376 | 5/1996 | Murthy et al. | 370/402 |
| 5,519,705 | 5/1996 | Fukutomi | 370/402 |

FOREIGN PATENT DOCUMENTS 6-85870    3/1994    Japan .

*Primary Examiner*—Ajit Patel
*Attorney, Agent, or Firm*—Helfgott & Karas, P.C.

[57] ABSTRACT

A SMDS (Switched Multi-megabit Digital Service) switching apparatus provides connectionless-mode high-speed digital data switching services suitable for use in connection between telecommunication terminals, e.g. LANs (Local Area Networks) via a network. The SMDS switching apparatus is formed of plural subscriber's circuits, each of the plural subscriber's circuits accommodating at least one subscriber's terminal; an automatic routing selection switch connected to the plural subscriber's circuits, the automatic routing selection switch receiving a fixed length cell formed of a logic channel information portion and a data portion and selecting automatically an output route for the fixed-length cell, based on information in the logic channel information portion; and an analyzing unit receiving a fixed-length cell sent from the automatic routing selection switch and then analyzing sender information and receiver information each regarding the fixed-length cell. The object is to provide a SMDS switching apparatus wherein an arrival-site processing unit executes the routing procedure in an originating-site processing unit to suppress an increase in the capacity of the routing table.

20 Claims, 31 Drawing Sheets

FIG. I

F I G. 7
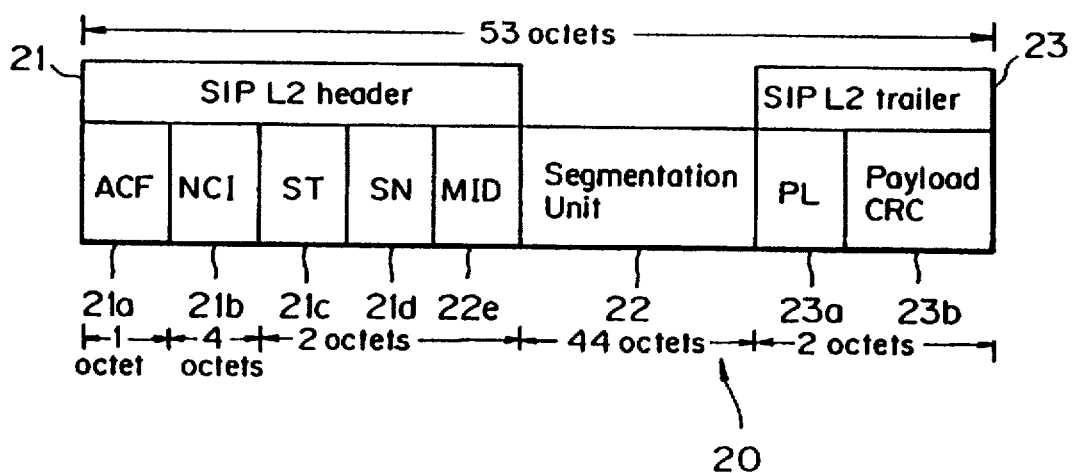

FIG. 15(a) FIRST SEGMENT
FIG. 15(b) SECOND SEGMENT
FIG. 15(c) THIRD SEGMENT
FIG. 15(d) LAST SEGMENT

F I G. 16
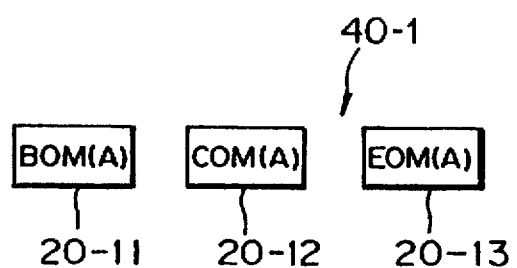
F I G. 17
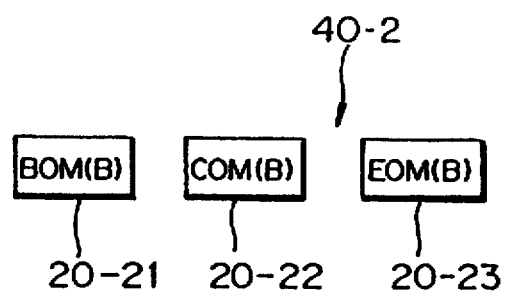

| DA | ROUTING INFORMATION | SA SCREENING | DA SCREENING |
|----|---------------------|--------------|--------------|
| 01 | a | 03 | 04, 05 |
| 02 | a | null | 04 |
| 03 | a | 03, 06 | null |
| 04 | b | null | null |

| DA | ROUTING INFORMATION | SA SCREENING | DA SCREENING |
|----|---------------------|--------------|--------------|
| 05 | c | 03 | 03 |
| 06 | c | null | null |

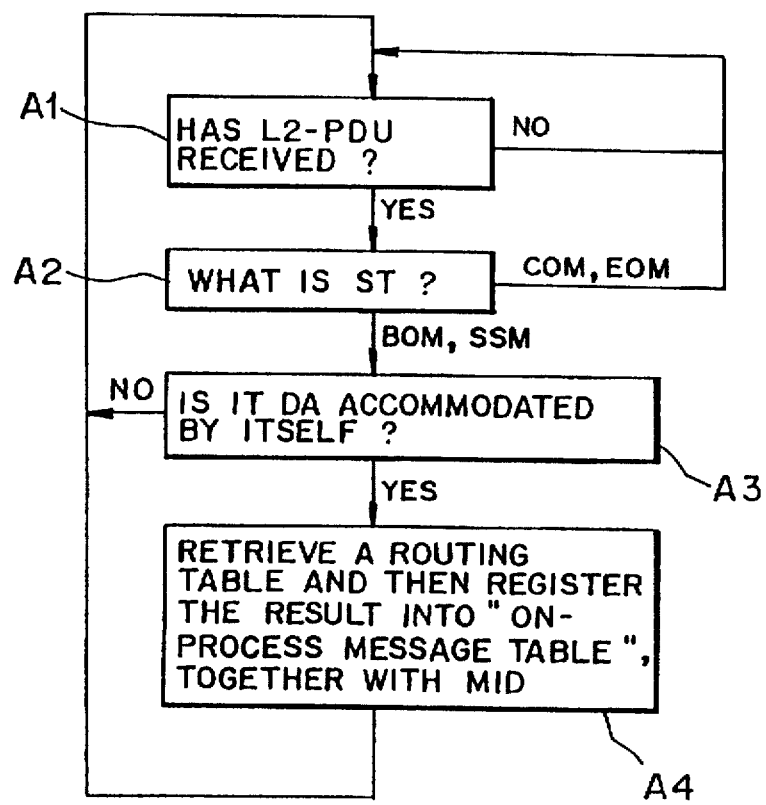
F I G. 21

F I G. 22

| ADDRESS (MID) | DATA (VPI/VCI) |
|---|---|
| 0 | 000/0000 |
| 1 | 675/0024 |
| 2 | 003/0818 |
| 3 | 000/0000 |
| ⋮ | ⋮ |
| 1023 | 000/0000 |

37A

F I G. 23
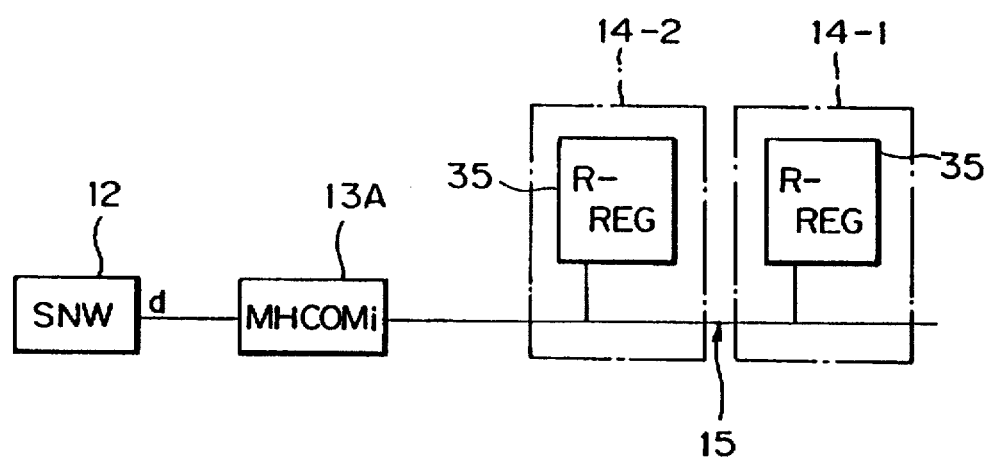

F I G. 26
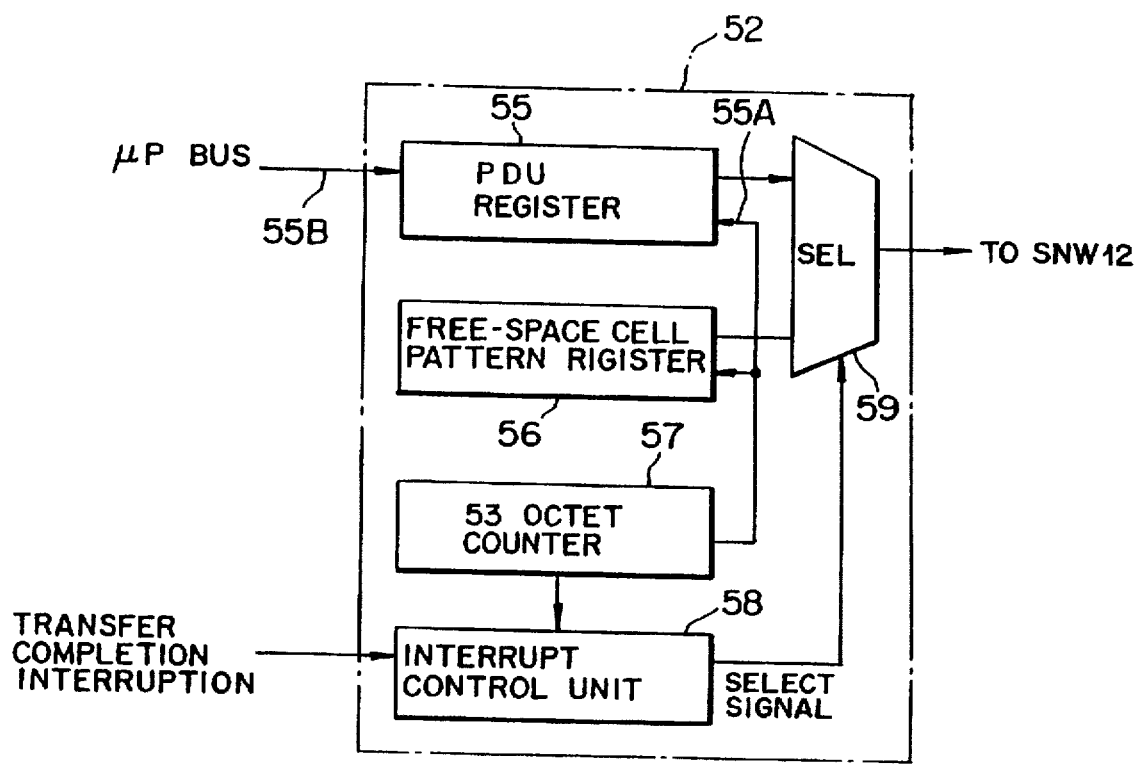

F I G. 29
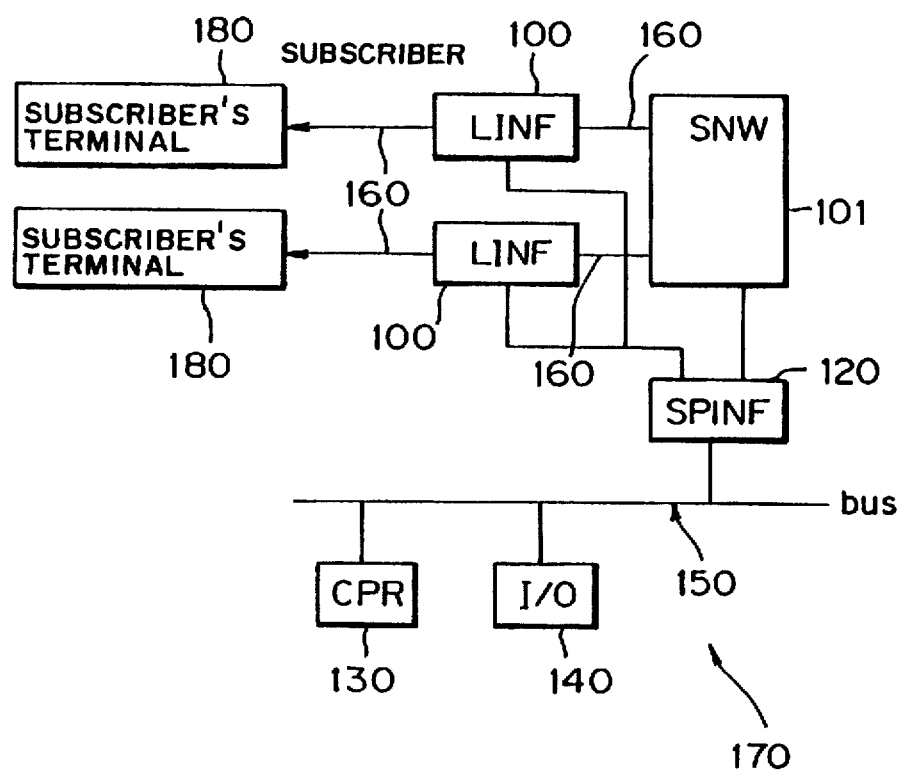

F I G. 30
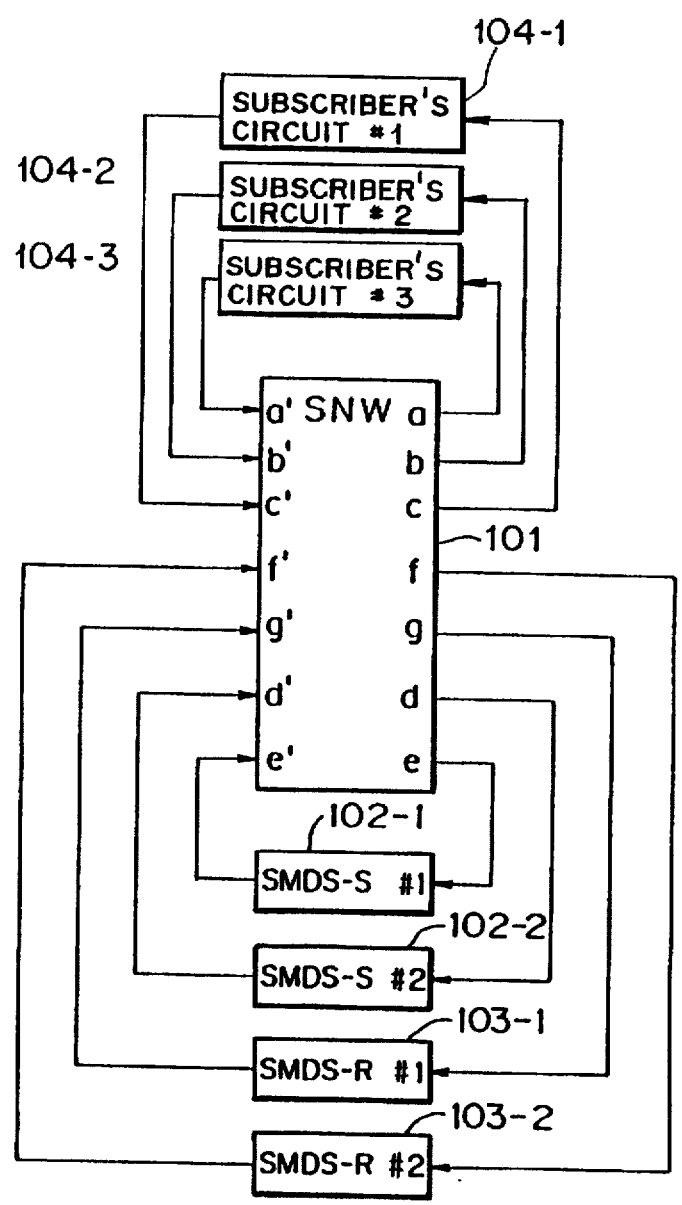

FIG. 32

| DA | ROUTING INFORMATION | DA SCREENING |
|---|---|---|
| 01 | f | 04,05 |
| 02 | f | 04 |
| 03 | f | null |
| 04 | f | null |
| 05 | g | null |
| 06 | g | 01 |

| DA | ROUTING INFORMATION | SA SCREENING |
|----|---------------------|--------------|
| 01 | a | 03 |
| 02 | a | null |
| 03 | a | 03, 06 |
| 04 | b | null |

| DA | ROUTING INFORMATION | SA SCREENING |
|----|---------------------|--------------|
| 05 | c | 03 |
| 06 | c | null |

SWITCHED MULTI-MEGABIT DIGITAL SERVICE SWITCHING APPARATUS

BACKGROUND OF THE INVENTION

1) Field of the Invention

The present invention relates to a SMDS (Switched Multi-megabit Digital Service) switching apparatus that provides connectionless-mode high-speed digital data switching services suitable for use in connection between telecommunication terminals, e.g. LANs (local Area Networks) via a network.

2) Description of the Related Art

Recently, in order to exchange information within a specific area or in-house, LANs (Local Area Networks) have been generally applied that are constructed by mutually connecting plural terminals, e.g. work stations.

With highly-information oriented society, LANs have increased their general versatility. Moreover, it has been increasingly needed to construct the system where LANs each located at a spot are mutually connected to execute a broad information transmission between LANs.

The SMDS (Switched Multi-megabit Digital Service) is a service which realizes a broad information transmission by mutually connecting LANs, or a kind of a connectionless-mode high-speed digital data switching service.

In the SMDS, a message exchanged between terminals are formed in a PDU (Protocol Data Unit) according to a standardized protocol stack. The PDU format of, for example, a layer 2 is formed so as to have a strong affinity for an ATM cell, namely, a fixed-length packet in an ATM (Asynchronous Transfer Mode) network.

With such increasing demands, many research and development institutions have vigorously studied and developed on constructing a SMDS switching apparatus by using general ATM switches as a SNW (Switching NetWork) to realize the above-described SMDS.

FIG. 29 is a block diagram illustrating an embodiment of a general switching apparatus which exchanges data between subscriber's terminals. The switching apparatus 170 shown in FIG. 29 includes plural LINFs 100, a SNW 101, a SPINF 120, a CPR 130, and an I/O interface 140.

Plural LINFs 100 which are connected in parallel to the SNW 101 via the highway 160 terminate access from the subscriber's terminals 180 and provide switching services. Each of the LINFs 100 accommodates at least one subscriber's terminal 170 consisting a sole LAN.

The SNW (Switching Network) 101 exchanges data input via the highway 160. The SNW 101 can be formed as an ATM switch which exchanges an ATM cell with a fixed-length when an ATM communication and SMDS service are provided.

Numeral 120 represents a SPINF. The SPINF 120 functions as an interface for a SP (Speech Path) system formed of the LINF 100 and the SNW 101 and a CP (Call Processor) system formed of the CPR 130 and the I/O interface 140 (to be described later).

Numeral 130 represents a CPR. The CPR 130 connected to the SPINF 120 via the bus 150 controls the whole switching apparatus and manages control information such as routing information to realize a SMDS service (to be described later). Namely, the LINF 100 and SNW 101 can exchange messages between the subscriber's terminals 180, based on control information input from the CPR 130 via the SPINF 120.

Moreover, numeral 140 represents an I/O interface. The I/O interface 140 inputs and outputs a signal used for a maintenance of the switching apparatus. The I/O interface 140 is formed of a disk device, magnetic tape device, a file memory, and the like.

In the switching apparatus 170 with above-described configuration as shown in FIG. 29, the CPR 130 outputs control information to the LINF 100 and the SNW 101 via the SPINF 120. The LINF 100 and the SNW 101 can exchange messages between the subscriber's terminals 180 based on the control information.

FIG. 30 is a diagram illustrating an example of a SMDS switching apparatus where the ATM switch is used as the SNW 101 in the switching apparatus 170 shown in FIG. 29.

Referring to FIG. 30, numerals 104-1 to 104-3 represent subscriber's circuits #1 to #3, respectively. The subscriber's circuits 104-1 to 104-3 realize the SNIs (Subscriber Network Interfaces) 106-1 to 106-3 each functioning as an interface between the SMDS subscriber's terminal and the SMDS network. Each subscriber's circuit terminates a single SNI.

In other words, as shown in FIG. 31, the subscriber's circuit 104-1 which terminates the SNI 106-1 accommodates the subscriber's terminals 105-1 to 105-3. The subscriber's circuit 104-2 which terminates the SNI 106-2 accommodates the subscriber's terminals 105-4. The subscriber's circuit 104-3 which terminates the SNI 106-3 accommodates subscriber's terminals 105-5 to 105-6.

The subscriber's terminals 105-1 to 105-3, the subscriber's terminal 105-4, and the subscriber's terminals 105-5 and 105-6 can construct a LAN.

A unique address (IA='01' to '06') representing the calling party or called party of a packet is allocated to each of the subscriber's terminals (subscribers) 105-1 to 105-6.

Numeral 101 represents a SNW formed of an ATM switch. The ATM switch 101 which has 7 input routes (refer to a' to g') and 7 output routes (refer to a to g) switches an ATM cell input to an input route at a high rate in hardware autonomous status.

The input routes a' to c' are connected to the subscriber's circuits 104-1 to 104-3, respectively. The input route d' is connected to the originating processing unit 102-1. The input route e' is connected to the originating processing unit 102-2. The input route f' is connected to the destination processing unit 103-1. The input route g' is connected to the destination processing unit 103-2.

Similarly, the output routes a to c are connected to the subscriber's circuits 104-1 to 104-3, respectively. The output route d is connected to the originating processing unit 102-1. The output route e is connected to the originating processing unit 102-2. The output route f is connected to the destination processing unit 103-1. The output route g is connected to the destination processing unit 103-2.

The originating processing units (SMDS-S) 102-1 and 102-2 subject messages coming from the SNI 106-1 to 106-3 to an originating process, namely, checking the normality of a message from each of the SNI 106-1 to 106-3, perform a screening process (a regulating process on an originating side) according to the SA (Source Address, originator's address) in the message, address analyzing, and add a tag for routing a message to the destination processing units 103-1 to 103-2 each accommodating the address.

The destination processing units (SMDS-R) 103-1 to 103-2 perform a message process on a receiving side, including the steps of checking the normality of a message from the originating processing units 102-1 and 102-2, screening (destination regulation process) based on the DA (Source Address, called party's address) in a message, and distinguishing the SNI as the delivery address of the message, and then adding a routing tag as the result.

The originating processing unit 102-1 and the destination processing unit 103-1 provide the LINF 100 accommodating the subscriber's terminals 105-1 to 105-4. The originating processing unit 102-2 and the destination processing unit 103-2 provide the LINF 100 accommodating the subscriber's terminals 105-5 and 105-6.

Each of the originating processing units 102-1 and 102-2 includes a routing table 102A formed of a memory in hardware, as shown in FIG. 32.

In other words, as shown in FIG. 32, the routing information and DA screening information are registered as DA to the addresses ('01' to '06') of all the subscriber's terminals 105-1 to 105-6 accommodated in the SNW 101.

The output routes (a to g) of the SNW to which the subscriber's terminals 105-1 to 105-6 are connected as the destination of the packet represented with DA are registered as the routing information. The address of a subscriber's terminal on a transmitting side representing the packet not be transmitted to the subscriber's terminal on the destination side is registered as the DA screening information.

The destination processing unit 103-1 includes the routing tables 103A shown in FIG. 33 and the destination processing unit 103-2 includes the routing table 103B shown in FIG. 34. Each of the routing tables 103A and 103B consists of, for example, a memory in hardware.

The routing table 103A in the destination processing unit 103-1 registers the routing information and SA screening information to the DA ('01' to '04') corresponding to the subscriber's terminals 105-1 to 105-4 accommodated by itself, as shown in FIG. 33.

Similarly, the routing table 103B in the destination processing unit 103-2 registers routing information and SA screening information to the DA ('05' to '06') corresponding to the subscriber's terminals 105-5 to 105-6 accommodated by itself, as shown in FIG. 34.

The output routes (a to g) of the SNW to which the subscriber's terminals 105-1 to 105-6 are connected as the destination's packets represented with DA are registered as the routing information. The address of a subscriber's terminal on an originating side representing the packet not be transmitted to the subscriber's terminal on a destination side are registered as the DA screening information.

The SMDS switching apparatus with the above-described configuration as shown in FIG. 30 can realize telecommunications between the subscriber's terminals 105-1 to 105-6 by exchanging the packet and ATM cell shown in FIG. 31.

For example, when a packet is transferred from the subscriber's terminal 105-2 to the subscriber's terminal 105-5, the subscriber's terminal 105-2 inputs a packet including SA='02' and DA='05' as header information to the subscriber's terminal 104-1 (refer to (a) in FIG. 31).

The subscriber's circuit 104-1 subjects the input packet to segmentation, or adds an ATM header, based on the DA included in the header information of the packet, and then outputs the result to the SNW 101.

The SNW 101 receives the ATM cell from the subscriber's circuit 104-1 via the input route a' and then outputs it to the originating processing unit 102-1 via the output route d, according to the ATM header information added based on the DA (refer to (b) in FIG. 31).

In other words, the subscriber's circuit 104-1 sets information to the ATM cell header such that it is switched to the output route d connected to the originating processing unit 102-1 accommodating itself.

The originating processing unit 102-1 receives the ATM cell from the SNW 101 and then routes the received packet by switching the ATM cell.

In concrete, the routing table 102A is retrieved based on the packet DA (in this case, 05) consisting the input ATM cell.

Here, the subscriber's terminal 105-5, or address, is accommodated in the subscriber's circuit 104-3 and the destination processing unit 103-2 accommodating the subscriber's circuit 104-3 is connected to the output route g of the SNW 101. Hence the routing information corresponding to DA='05' is retrieved as g in the routing table 102A.

The originating processing unit 102-1 sets information to the headers of all ATM cells carrying packets from the subscriber's terminal 105-2 so as to be switched to the output route g by means of the SNW 101.

When the originating processing unit 102-1 sets information to the header of an ATM cell carrying a packet, the ATM cell is output from the originating processing unit 102-1 to the SNW 101. The output ATM cell is input from the SNW 101 via the input route d and then input to the destination processing unit 103-2 via the output route g (refer to (c) in FIG. 31).

At the same time, the originating processing unit 102-1 executes the DA screening operation. That is, since the screening to DA='05' is '04', the packet transmission from the subscriber's terminal 105-4 to the subscriber's terminal 105-5 can be regulated (inhibited). In this case, the packet of which transmission is regulated is discarded in the originating processing unit 102-1.

When the destination processing unit 103-2 receives the ATM cell, it retrieves the routing table 103B (refer to FIG. 34) based on the received packet DA to execute the routing operation to the subscriber's terminals 105-5 and 105-6 accommodated by itself.

Since the subscriber's circuit 104-3 accommodating the subscriber's terminal 105-5 is accommodated to the output route of the SNW 101, the routing information corresponding to DA='05' can be retrieved as the output route c with reference to the routing table 103B. Consequently, the destination processing unit 103-2 sets information to the header so as to switch the received ATM cell to the output route c.

When the ATM cell is output from the destination processing unit 103-2 to the SNW 101, the SNW 101 receives the ATM cell from the input route g'. Then the ATM cell is switched to the output route c, based on the header information in the ATM cell, and then arrives at the subscriber's circuit 104-3.

At the same time, the destination processing unit 103-2 performs the SA screening operation. Since the screening to DA='05' results in '03', the packet transmission from the subscriber's terminal 105-3 to the subscriber's terminal 105-5 is regulated (or inhibited). In this case, the packet of which the packet transmission is regulated is discarded in the destination processing unit 103-2.

The packet input to the subscriber's circuit 104-3 as the ATM cell is transmitted to the subscriber's terminals 105-5 and 105-6 accommodated by the subscriber's circuit 104-3. Each of the subscriber's terminals 105-5 and 105-6 refers to the packet DA and then captures only the packet of which the DA is matched with the IA. Thus the packet can be transferred from the subscriber's terminal 105-2 to the subscriber's terminal 105-5.

However, in the SMDS switching apparatus, since the message routing process is shared by the originating processing units 102-1 and 102-2 and destination processing units 103-1 and 103-2, it is needed that the originating processing units 102-1 and 102-2 execute the routing operation while the destination processing units 103-1 and 103-2 execute again the routing analysis to separate off the SNI.

Furthermore, the originating processing units 102-1 and 102-2 have to hold the routing information regarding the delivery addresses to all subscriber's terminals. Hence there is a problem that an increasing number of subscribers leads to the shortage of memory capacity because the memory capacity of the routing table formed by hardware is physically restricted.

As a countermeasure, the method may be considered in which all pieces of routing information are held by software; a part of all pieces of routing information is accommodated in the routing table in an originating processing unit; and the corresponding routing information is captured by retrieving all pieces of routing information with a software when the DA of a received message is not hit in the routing table while the routing table is updated by transferring the corresponding information to the originating processing unit.

However, if the method described above is adopted to the routing operation processed at high rate, it is difficult to update the routing table since a software process of which the process rate is slower than the hardware process is needed.

Moreover, the method may be considered in which each of the destination processing units implements the routing analysis by transmitting the corresponding message to all destination processing units when the DA of a received message is not hit in the routing table in an originating processing unit without any software.

However, the use of such a method leads to the traffic of the SNW which may have instantaneously a very high burst, thus making it difficult to control the traffic of the SNW. At the end, suppressing a traffic with a high burst results in an increase in the capacity of the routing table in the originating processing unit.

SUMMARY OF THE INVENTION

The present invention is made to overcome the above mentioned problems. An object of the present invention is to provide a SMDS switching apparatus wherein a processing unit at an arrival site executes the routing procedure of a processing unit at an originating-site to suppress an increase in the capacity of the routing table.

In order to achieve the above objects, according to the present invention, the SMDS (switched multi-megabit digital service) switching apparatus is characterized by plural subscriber's circuits, each of the plural subscriber's circuits accommodating at least one subscriber's terminal; an automatic routing selection switch connected to the plural subscriber's circuits, the automatic routing selection switch receiving a fixed length cell formed of a logic channel information portion and a data portion and selecting automatically an output route for the fixed-length cell, based on information in the logic channel information portion; and an analyzing unit for receiving the fixed-length cell sent from the automatic routing switch and then analyzing sender information and receiver information each regarding the fixed-length cell.

According to the present invention, since the SMDS switching apparatus includes an analyzing unit that receives the fixed-length cell sent from the automatic routing switch and then analyzes sender information and receiver information each regarding the fixed-length cell, the process at an originating site can be simplified so that it is unnecessary to arrange a SMDS-S acting as the processing unit at an originating site. Hence there is an advantage in that the hardware scale can be reduced and the system constructing cost can be reduced.

Moreover, it is unnecessary to repeat the routing analysis several times in the switching apparatus because the analyzing unit analyzes sender information and receiver information. Thus a high-speed processing can be expected.

The analyzing unit does not execute a possible process in which the traffic with very high burst occurs simultaneously. Hence there is an advantage in that the traffic of the automatic routing selection switch can be properly controlled.

Furthermore, according to the present invention, the SMDS (switched multi-megabit digital service) switching apparatus is characterized by plural subscriber's circuits, each of the plural subscriber's circuits accommodating at least one subscriber's terminal; an automatic routing switch connected to the plural subscriber's circuits, the automatic routing switch receiving a fixed length cell formed of a logic channel information portion and a data portion and selecting automatically an output route for the fixed-length cell, based on information in the logic channel information portion; an analyzing unit receiving the fixed-length cell sent from the automatic routing switch and then analyzing sender information and receiver information each regarding the fixed-length cell; and a normality checking unit checking the normality of a transmit/receive fixed-length cell to the automatic routing switch.

According to the present invention, since the SMDS switching apparatus includes a normality checking unit that checks the normality of a transmission/reception fixed-length cell sent to the automatic routing selection switch, only the fixed-length cell for the normal SMDS switching operation can be output so that the load of the analyzing unit can be released. Hence there is an advantage in that the operation of the system can be stabilized.

According to the present invention, the SMDS (switched multi-megabit digital service) switching apparatus is characterized by plural subscriber's circuits, each of the plural subscriber's circuits accommodating at least one subscriber's terminal; an automatic routing selection switch connected to the plural subscriber's circuits, the automatic routing selection switch receiving a fixed length cell formed of a logic channel information portion and a data portion and selecting automatically an output route for the fixed-length cell, based on information in the logic channel information portion; and at least one analyzing unit connected in parallel between an input route and an output route of the automatic routing selection switch via a single route bus to analyze sender information and receiver information each regarding the fixed-length cell.

According to the present invention, the SMDS switching apparatus includes at least one analyzing unit connected in parallel between an input route and an output route of the automatic routing switch via a single route bus to analyze sender information and receiver information each regarding the fixed-length cell. Hence, there is an advantage in that an increasing number of subscribers can be easily dealt with by newly increasing, for example, a subscriber circuit and an analyzing unit.

Furthermore, according to the present invention, the SMDS (switched multi-megabit digital service) switching apparatus is characterized by plural subscriber's circuits, each of the plural subscriber's circuits accommodating at least one subscriber's terminal; an automatic routing switch connected to the plural subscriber's circuits, the automatic routing switch receiving a fixed length cell formed of a logic channel information portion and a data portion and selecting automatically an output route for the fixed-length cell, based on information in the logic channel information portion; at least one analyzing units connected in parallel between an input route and an output route of the automatic routing switch via a single route bus to analyze sender information and receiver information each regarding the fixed-length cell; a first normality checking unit for checking the normality of a fixed-length cell in the output route of the automatic routing switch; and a second normality checking unit for checking the normality of a fixed-length cell in the input route of the automatic routing switch.

According to the present invention, since the SMDS switching apparatus includes a normality checking unit that checks the normality of a transmission/reception fixed-length sent to the automatic routing switch, only the fixed-length cell for the normal SMDS switching operation can be output so that the load of the analyzing unit can be released. Hence there is an advantage in that the operation of the system can be stabilized.

BRIEF DESCRIPTION OF THE DRAWINGS

FIG. 7 is a diagram illustrating a data format of SIP L2-PDU according to an embodiment of the present invention;

FIG. 16 is a diagram used for explaining the operation of SMDS-R according to an embodiment of the present invention;

FIG. 17 is a diagram used for explaining the operation of SMDS-R according to an embodiment of the present invention;

FIG. 19 is a diagram illustrating the routing table for SMDS-R according to an embodiment of the present invention;

FIG. 20 is a diagram illustrating the routing table for SMDS-R according to an embodiment of the present invention;

FIG. 21 is a flowchart explaining the operation of the main portion of SMDS-R according to an embodiment of the present invention;

FIG. 22 is a on-process message table of SMDS-R according to an embodiment of the present invention;

FIG. 23 is a block diagram illustrating the common portion according to an embodiment of the present invention;

FIG. 26 is a block diagram illustrating in detail the common portion according to an embodiment of the present invention;

FIG. 29 is a block diagram illustrating an embodiment of a general switching apparatus;

FIG. 30 is a diagram illustrating the main portion of an embodiment of a SMDS switching apparatus;

FIG. 32 is a diagram illustrating a routing table in an originating-site processing unit;

FIG. 33 is a diagram illustrating a routing table in an arrival-site processing unit; and FIG. 34 is a diagram illustrating a routing table in an arrival-site processing unit.

DESCRIPTION OF THE PREFERRED EMBODIMENTS (a) Explanation of the aspects of the invention:

The aspects of the present invention will be described below with reference to the attached drawings.

Figure 1:
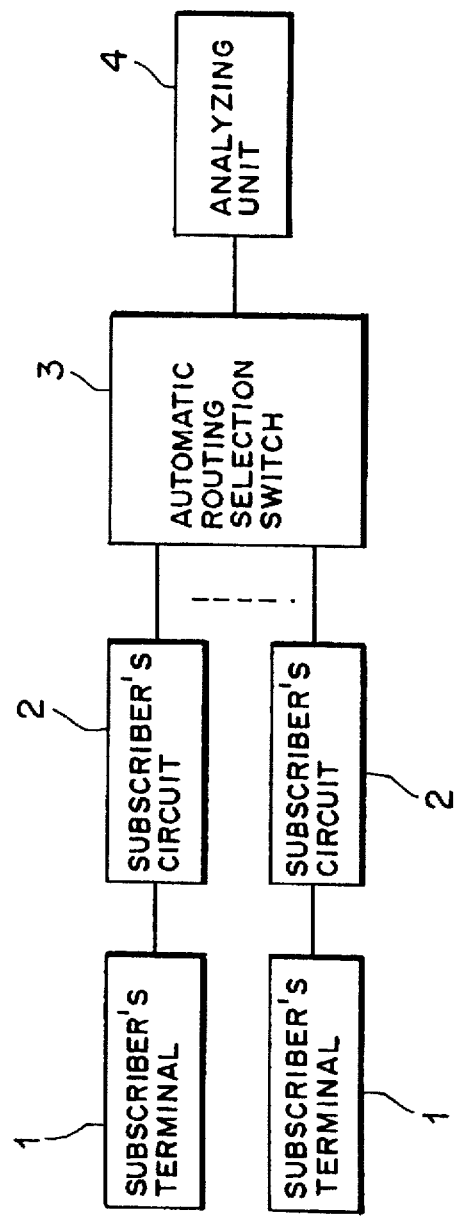
FIG. 1 is a block diagram showing a SMDS switching apparatus according to a first aspect of the present invention.

FIG. 1 is a block diagram showing a SMDS switching system according to an aspect of the present invention. Referring to FIG. 1, numeral 2 represents each of plural subscriber's circuits. Each of the plural subscriber's circuits 2 accommodate at least one subscriber's terminal.

Numeral 3 represents an automatic routing selection switch. The automatic routing selection switch 3 connected to plural subscriber's circuits 2 receives a fixed-length cell formed of a logic channel information portion and a data portion and then selects and outputs automatically the output route for a fixed-length cell, based on information in the logic channel information unit.

Numeral 4 represents an analyzing unit. The analyzing unit 4 receives a fixed-length cell from the automatic routing selection switch 3 and then analyzes sender information and receiver information each regarding the fixed-length cell.

In the SMDS switching apparatus according to the first aspect of the present invention, as shown in FIG. 1, the automatic routing selection switch 3 outputs selectively and automatically the output route for an input fixed-length cell, based on the information of the logic channel information portion.

The analyzing unit 4 receives a fixed-length cell from the automatic routing selection switch 3 and then analyzes sender information and receiver information each regarding the fixed-length cell.

According to the present invention, since the SMDS switching apparatus includes an analyzing unit that receives a fixed-length cell from the automatic routing selection switch and then analyzes sender information and receiver information each regarding the fixed-length cell, the process on an originating side can be simplified. Hence, it is not needed to prepare the SMDS-S acting as an originating processing unit so that the hardware scale can be reduced. Hence the SMDS switching apparatus has an advantage of reducing the device forming cost.

Moreover, the high-rate processing can be expected because analyzing sender information and receiver information by means of the analyzing unit allows repeating the same routing analysis in the switching apparatus several times to be neglected.

Moreover, there is an advantage in that the analyzing unit does not need to implement a process which may cause instantaneously a traffic with very high burst so that the traffic of the automatic routing selection switch can be properly controlled.

Figure 2:
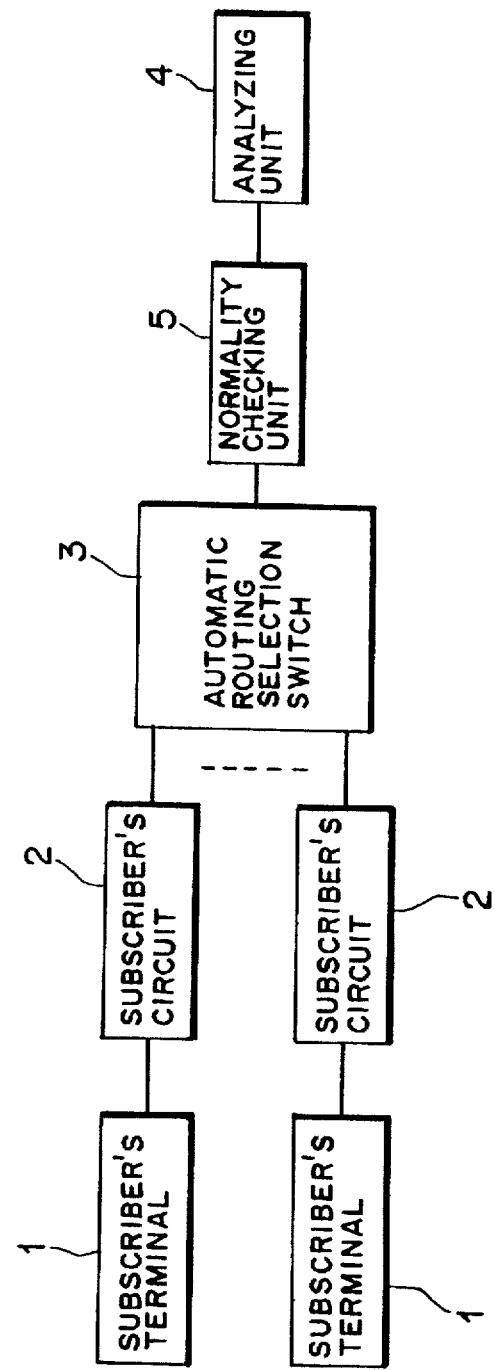
FIG. 2 is a block diagram showing a SMDS switching apparatus according to a second aspect of the present invention.

FIG. 2 is a block diagram illustrating the second aspect of the present invention. Referring to FIG. 2, numeral 2 represents respectively plural subscriber's circuits each which accommodates at least one subscriber's terminal.

Numeral 3 represents an automatic routing selection switch. The automatic routing selection switch 3 connected to plural subscriber's circuits 2 receives a fixed-length cell formed of a logic channel information portion and a data portion and outputs selectively and automatically the output route for the fixed-length cell, based on information of the logic channel information portion.

Numeral 4 represents an analyzing unit that analyzes sender information and receiver information, based on information of the logic channel information portion in a fixed-length cell from the automatic routing selection switch 3. Numeral 5 represents a normality checking unit that checks the normality of a transmit/receive fixed-length cell to the automatic routing selection switch 3.

In the SMDS switching apparatus according to the second aspect of the present invention, as shown in FIG. 2, the automatic routing selection switch 3 outputs selectively and automatically an output route for an input fixed-length cell, based on the information in the logic channel information portion.

The analyzing unit 4 analyzes sender information and receiver information, based on information of a logic channel information portion of a fixed-length cell sent via the automatic routing selection switch 3. The normality checking unit 5 checks the normality of a transmit/receive fixed-length cell to the automatic routing selection switch 3.

According to the present invention, since the SMDS switching apparatus includes the normality checking unit that checks the normality of a transmit/receive fixed-length cell to the automatic routing selection switch 3, only the fixed-length cell of a normalized SMDS switching apparatus can be output onto the bus. Hence there is an advantage in that the burden on the analyzing unit can be released so that the operation of the device can be stabilized.

Figure 3:
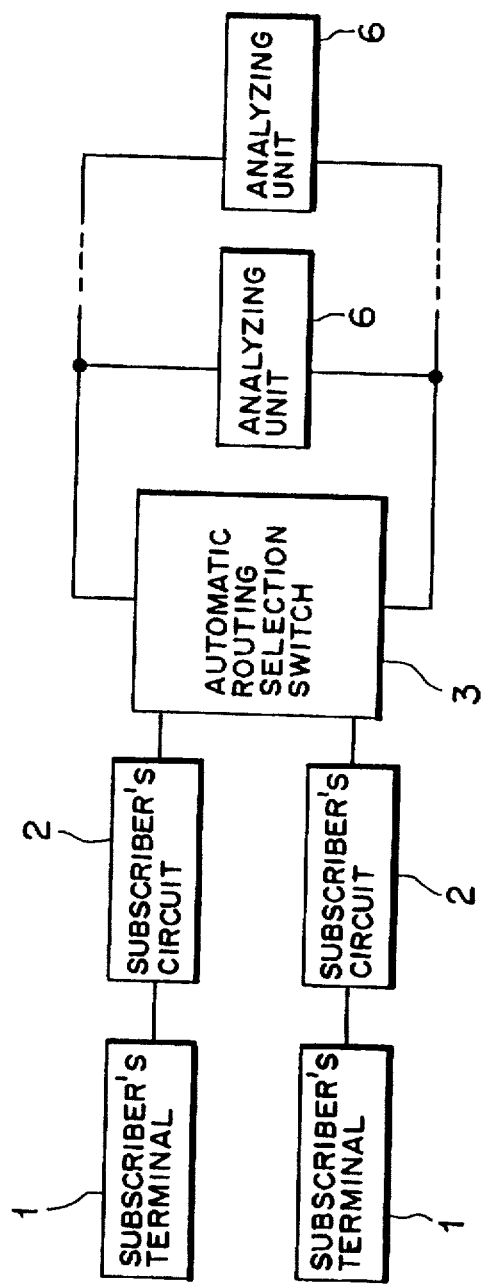
FIG. 3 is a block diagram showing a SMDS switching apparatus according to a third aspect of the present invention.

FIG. 3 is a block diagram illustrating a SMDS switching apparatus according to a third aspect of the present invention. Referring to FIG. 3, numerals 2 represent plural subscriber's circuits each which accommodates at least one subscriber's terminal.

Numeral 3 represents an automatic routing selection switch. The automatic routing selection switch 3 connected to the plural subscriber's circuits 2 receives a fixed-length cell formed of a logic channel information portion and a data portion and outputs selectively and automatically the output route, based on information of the logic channel information portion, to output the fixed-length cell.

Numeral 6 represents an analyzing unit 6 that analyzes sender information and receiver information each regarding a fixed-length cell. At least one analyzing unit 6 is connected in parallel between the input route and the output route of the automatic routing selection switch 3 via a single route bus.

In the SMDS switching system according to the third aspect of the present invention, as shown in FIG. 3, the automatic routing selection switch 3 selects automatically the output route, based on the information of the logic channel information portion, and then outputs an input fixed-length cell.

At least one analyzing unit 6 connected in parallel via the single route bus analyzes sender information and receiver information each regarding a fixed-length cell.

According to the present invention, the SMDS switching apparatus includes at least one analyzing unit that is connected in parallel between the input route and the output route of the automatic routing selection switch via the single route bus to analyze sender information and receiver information each regarding a fixed-length cell. Hence there is an advantage in that an increasing number of subscribers can be easily dealt by newly adding, for example, a subscriber's circuit and an analyzing unit.

Figure 4:
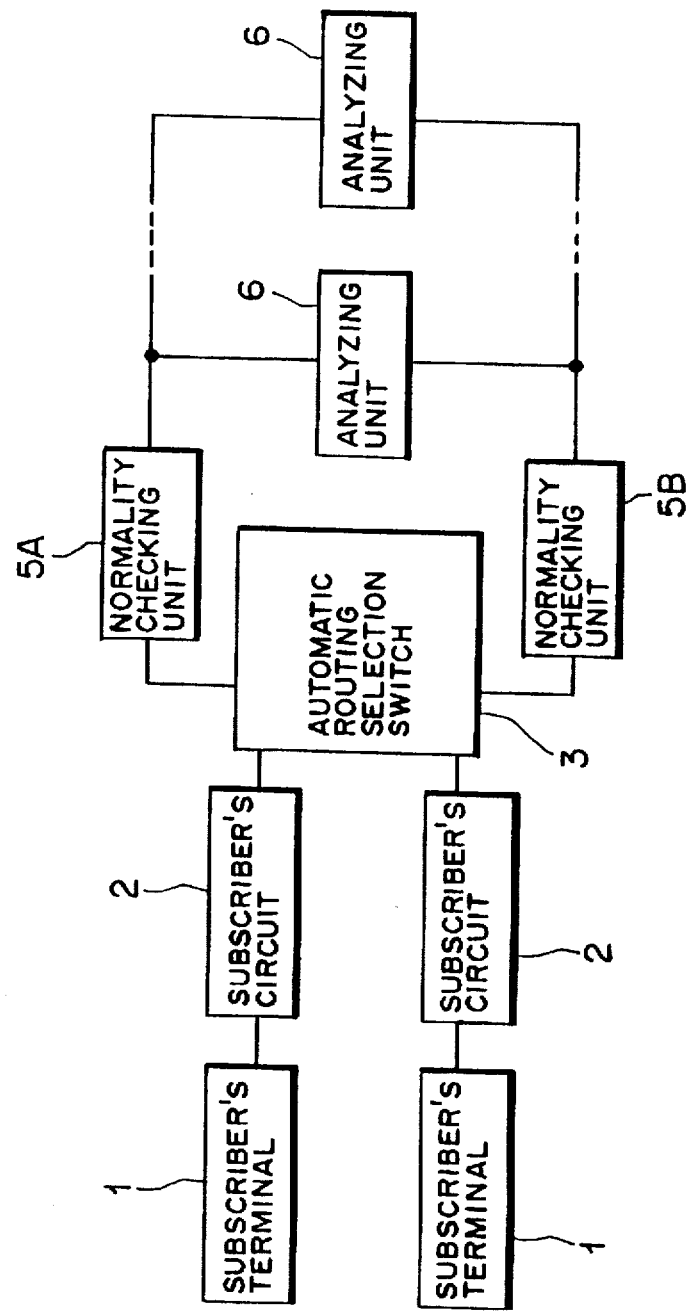
FIG. 4 is a block diagram showing a SMDS switching apparatus according to a fourth aspect of the present invention.

FIG. 4 is a block diagram illustrating a fourth aspect of the present invention. Referring to FIG. 4, numerals 2 represent plural subscriber's circuits. Each of the plural subscriber's circuits 2 accommodate at least one subscriber's terminal.

Numeral 3 represents an automatic routing selection switch. The automatic routing selection switch 3 connected to plural subscriber's circuits 2 receives a fixed-length cell formed of a logic channel information portion and a data portion to select the output route based on the information of the logic channel information portion and then outputs the fixed-length cell.

Numeral 6 represents an analyzing unit that analyzes sender information and receiver information each regarding a fixed-length cell. At least one analyzing unit 6 is connected in parallel between the input route and the output route of the automatic routing selection switch 3 via the single route bus.

Numeral 5A represents a first normality checking unit that checks the normality of a fixed-length cell in the output route of the automatic routing switch 3. Numeral 5B represents a second normality checking unit that checks the normality of a fixed-length cell in the output route of the automatic routing selection switch 3.

In the SMDS switching apparatus according to the fourth aspect of the present invention, as shown in FIG. 4, the automatic routing selection switch 3 selects automatically the output route, based on the information of the logic channel information unit, and then outputs an input fixed-length cell.

At least one analyzing unit 6 connected in parallel via the single route bus analyzes sender information and receiver information each regarding a fixed-length cell. Each of the first normality checking unit 5A and the second normality checking unit 5B check a transmit/receive fixed-length cell input to the automatic routing selection switch 3.

According to the present invention, the SMDS switching apparatus includes a normality checking unit that checks the normality of a transmit/receive fixed-length cell input to the automatic routing selection switch, thus outputting only a normalized fixed-length cell therefor on the bus. Therefore, there is an advantage in that the burden of the analyzing unit can be reduced so that the operation of the device can be stabilized.

In the SMDS switching apparatus according to the first to fourth aspects of the present invention, each of the analyzing units 4 and 6 includes a routing table which stores routing information to the receiver information regarding fixed-length cells, and an output route deciding unit that decides the output route to be selected by the automatic routing switch 3, based on the routing information stored in the routing table.

Thus routing information to receiver information regarding a fixed-length cell is stored in the routing table of each of the analyzing units 4 and 6. The output route deciding unit can decide the output route from the automatic routing selection switch 3, based on routing information stored in the routing table.

According to the present invention, the analyzing unit can include a routing table. Hence the routing table realized by only hardware can improve the process speed, compared with that realized by software.

According to the first to fourth aspects of the present invention, the SMDS switching apparatus may include a transfer regulating and processing unit that regulates transmitting a fixed-length cell to the automatic routing selection switch 3 when the analyzing unit 4 or 6 analyzes sender information regarding a fixed-length cell and then finds that the fixed-length cell is one transmitted from an ineligible sender, or regulates transferring a fixed-length cell to the automatic routing selection switch 3 when a fixed-length cell is one transmitted to an ineligible receiver.

Thus, the transfer regulating and processing unit can regulate transferring a fixed-length cell to the automatic routing switch 3 when the analyzing unit 4 or 6 analyzes sender information regarding a fixed-length cell and then finds that the fixed-length cell is one transmitted from an ineligible sender or that the fixed-length cell is one transmitted to an ineligible receiver.

According to the present invention, arranging the transfer regulating and processing unit allows simplifying an originating process as well as arranging no SMD-S as an originating processing unit. Hence there is an advantage in that the hardware scale can be reduced so that the system constructing cost can be reduced.

According to the first to fourth aspects of the present invention, the SMDS switching apparatus may include a transfer regulating and processing unit that has a routing table arranged in the analyzing unit 4 or 6 which registers an ineligible sender information and receiver information each corresponding to the receiver information regarding a fixed-length cell, and regulates transmitting a fixed-length cell to the automatic routing selection switch 3 when a fixed-length cell is one transmitted from an ineligible sender or one transmitted to an ineligible receiver.

Thus, with the routing table arranged in each of the analyzing units 4 and 6 registers ineligible sender information and receiver information each corresponding to receiver information regarding fixed-length cells. When a fixed-length cell is transmitted from an inappropriate sender or to an ineligible receiver according to the information stored in the routing table, the transfer regulating unit can regulate the fixed-length cell transferred to the automatic routing selection switch 3.

According to the present invention, arranging the transfer regulating unit allows simplifying the originating process and neglecting SMDS-S acting as the originating processing unit. Hence, there is an advantage in that the hardware scale can be reduced and the device constructing cost can be reduced.

Moreover, in the SMDS switching apparatus according to the first to fourth aspects, the routing table in the analyzing unit 4 can store only information regarding receivers accommodated by the analyzing unit 4 as routing information.

Hence when the routing table of the analyzing unit 4 stores only information regarding a receiver accommodated by the analyzing unit 4 as routing information, the capacity of the routing table can be effectively used.

According to the present invention, since the routing table of the analyzing unit stores only information regarding receivers accommodated by the analyzing unit as routing information, it can be easily realized using only hardware. There is an advantage in that the processing speed can be improved, compared with the routing table using software.

(b) Outline of a SMDS switching apparatus according to an embodiment of the present invention:

The embodiment according to the present invention will be explained below by referring to the drawings.

First, the outline of a SMDS switching apparatus according to an embodiment of the present invention will be explained below. The SMDS switching apparatus shown in FIG. 5 includes a SNW (Switching Network) 12. The SNW 12 can be formed using an ATM switch, like that shown in FIG. 30.

Figure 6:
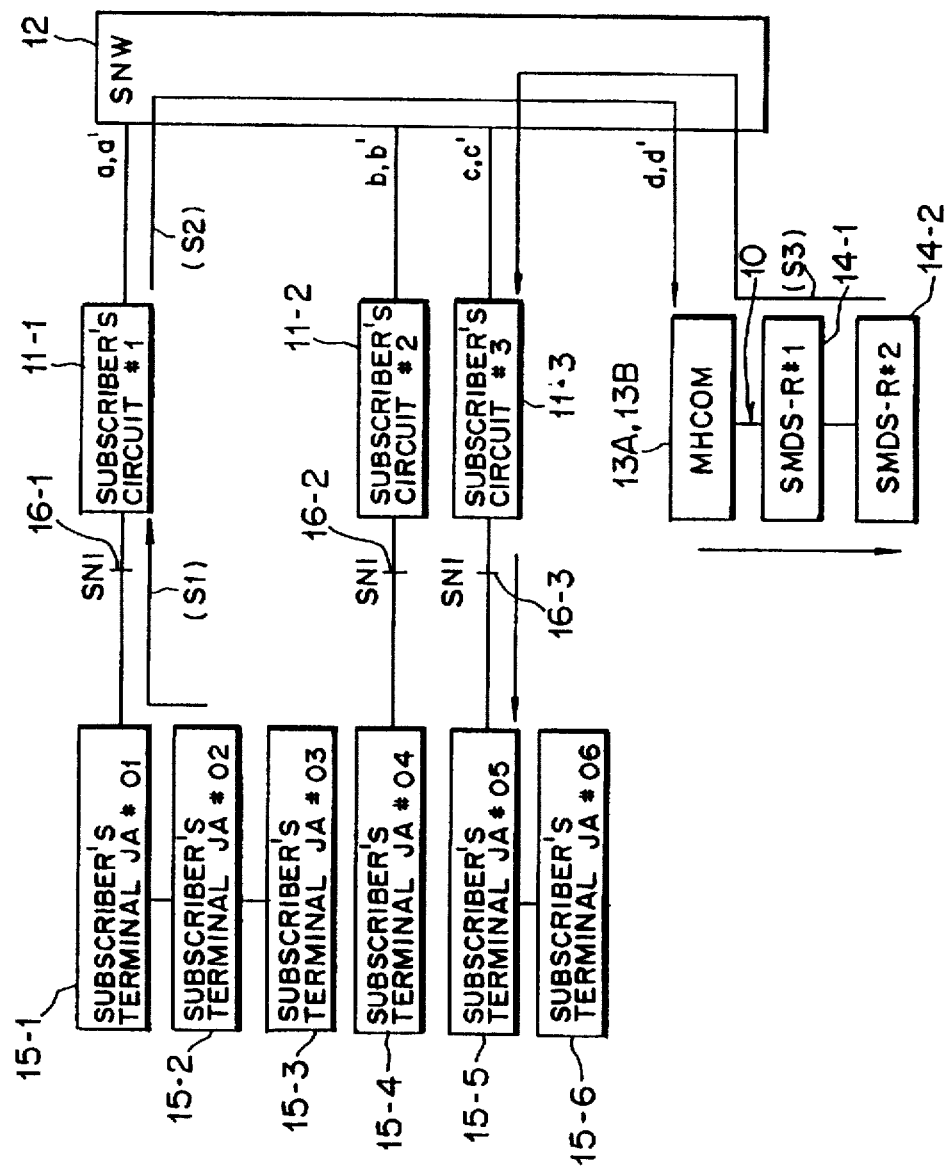
FIG. 6 is a block diagram showing a SMDS switching apparatus according to an embodiment of the present invention.

Numerals 11-1 to 11-3 represent subscriber's circuits (#1 to #3). The subscriber's circuit 11-1, for example, as shown in FIG. 6, realizes a SNI (Subscriber Network Interface) 16-1 acting as an interface to a SMDS subscriber's terminal and a SMDS network. The subscriber's circuit 11-2 realizes a SNI (Subscriber Network Interface) 16-2 acting as an interface to a SMDS subscriber's terminal and a SMDS network. The subscriber's circuit 11-3 realizes a SNI (Subscriber Network Interface) 16-3 acting as an interface to a SMDS subscriber's terminal and a SMDS network.

The subscriber's circuit 11-1 terminates the SNI 16-1 and accommodates the subscriber's terminals (SMDS subscriber's terminals) 15-1 to 15-3. The subscriber's circuit 11-2 terminates the SNI 16-2 and accommodates the subscriber's terminals 15-4. The subscriber's circuit 11-3 terminates the SNI 16-3 and accommodates the subscriber's terminals (SMDS subscriber's terminals) 15-5 and 15-6.

Figure 8:
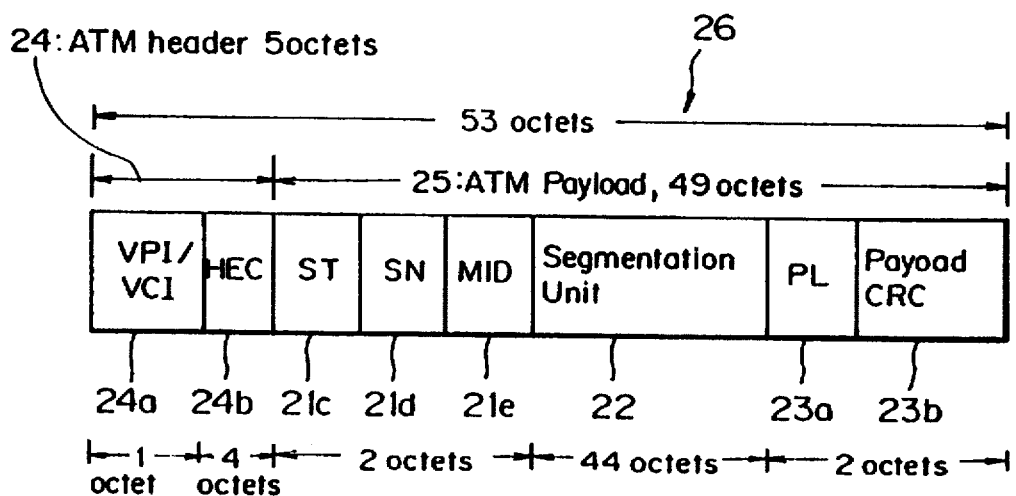
FIG. 8 is a diagram illustrating a data format of an ATM cell according to an embodiment of the present invention.

In concrete, each of the subscriber's circuits 11-1 to 11-3 maps data between SIP L2-PDU (SMDS Interface Protocol Level 2-Protocol Data Unit) acting as a data format (as shown in FIG. 7 to be described later) used when the subscriber's terminals 15-1 to 15-6 transmit and receive data, and the data format of the fixed-length cell (ATM cell) 26 used in a data switching operation (as shown in FIG. 8 to be described later) in the SNW 12.

An LAN (Local Area Network) can be constructed using the subscriber's terminals 15-1 to 15-3 described above, the subscriber's terminal 15-4, and the subscriber's terminals 15-5 and 15-6. Unique addresses (IA='01' to '06') each showing a packet's sender or receiver are allocated to the subscriber's terminals (subscribers) 15-1 to 15-6, respectively. Thus data transmission and reception can be mutually performed according to the data format (SIP L2-PDU) of PDU of the layer 2.

The SNW (automatic routing selection switch) 12 is formed of the ATM switch described above. The SNW 12 has four input routes (refer to a' to d') and seven output routes (refer to a to d) and switches a fixed-length cell (ATM cell) input to an input route autonomously to hardware at a high speed.

The input routes a' to c' are respectively connected to the subscriber's circuits 11-1 to 11-3. The input route d' is connected to the common unit 13B. Similarly, the output routes a to c are respectively connected to the subscriber's circuits 11-1 to 11-3. The output route d is connected to the common unit 13A.

The common unit (first normality checking unit) 13A checks the normality of the ATM cell 26 output from the output route d of the SNW 12. The ATM cell 26 checked in normality is distributed and output to the SMDS-R14-1 and SMDS-R14-2 via the bus 10.

The common unit 13B (second normality checking unit) 13B checks the normality of the ATM cell 26 input to the input route d' of the SNW 12. That is, the common unit 13B checks the normality of an ATM cell input from the SMDS-Rs14-1 and 14-2 to the input route d' of the SNW 12.

Figure 9:
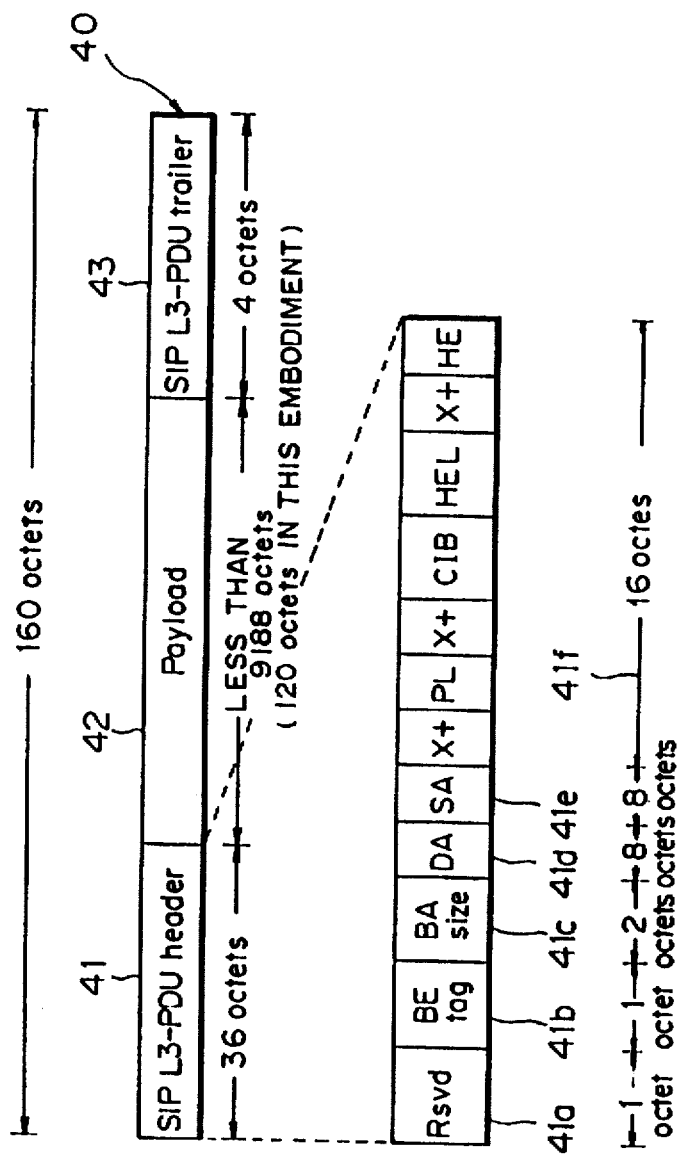
FIG. 9 is a diagram illustrating a data format of SIP L3-PDU according to an embodiment of the present invention.

Each of numerals 14-1 and 14-2 represents a SMDS-R (analyzing unit and transfer regulating unit). The SMDS-Rs 14-1 and 14-2 connected in parallel between the input route and output route of the SNW 12 via a single route bus and implements a routing process by analyzing sender information and receiver information regarding an ATM cell, or recognizing SIP L3-PDU 40 (as shown in FIG. 9 to be described later) from the ATM cell 26 output from the common unit 13A.

Figure 31:
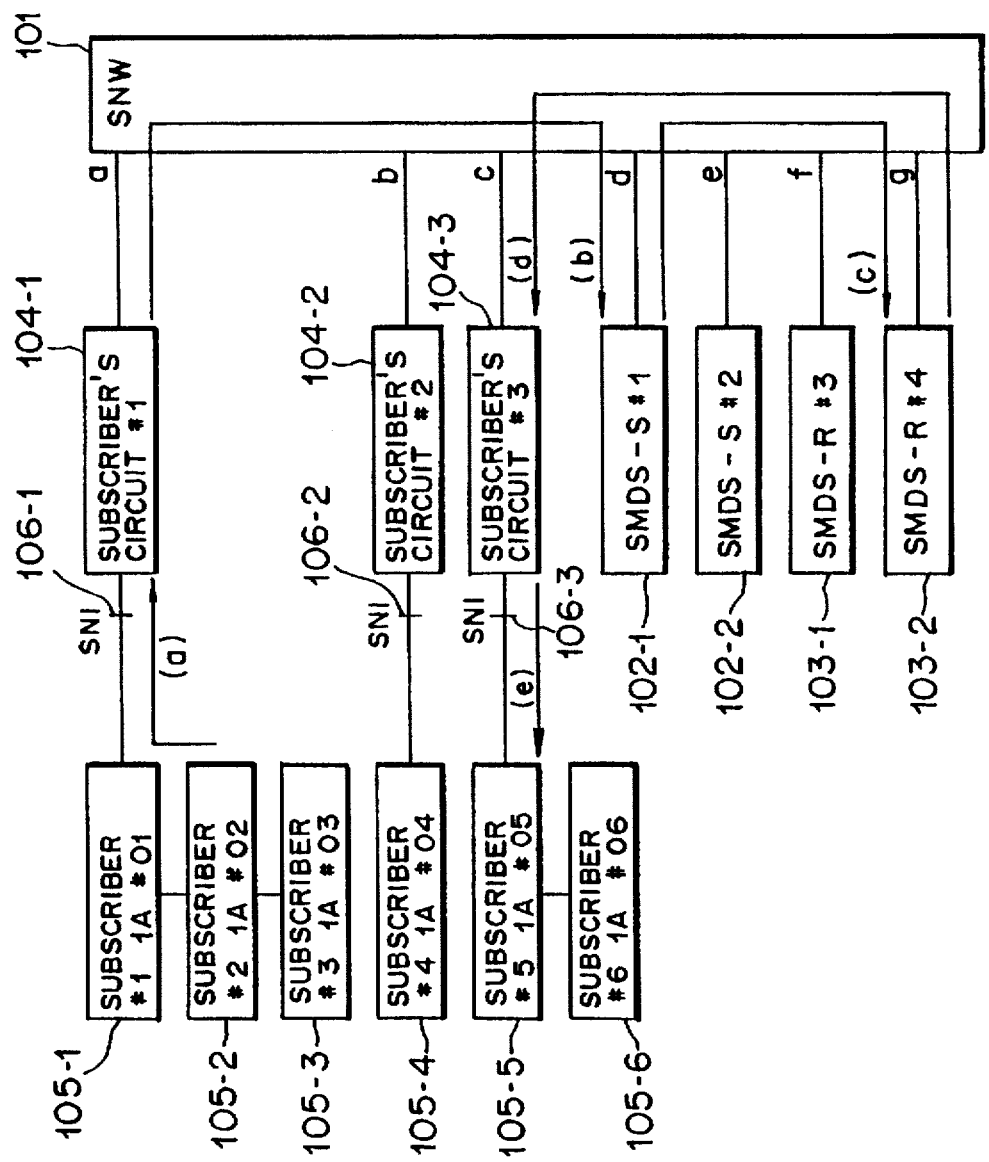
FIG. 31 is a block diagram used for explaining the operation of a SMDS switching apparatus.

Like the originating processing unit and receiving processing unit (refer to numerals 102-1, 102-2, 103-1, and 103-2) shown in FIGS. 30 and 31, the SMDS-Rs 14-1 and 14-2 perform an originating transfer regulating process and a receiving transfer regulating process.

Each of the SMDS-Rs 14-1 and 14-2 implements an originating transfer regulating process (SA screening) which regulates a transfer of an ATM cell to the SNW 12 when the ATM cell is transmitted from an inappropriate sender and implements a receiving transfer regulating process (SA screening) which regulates a transfer of an ATM cell to the SNW 12 when the ATM cell is transmitted to an inappropriate receiver.

In concrete, each of the SMDS-Rs 14-1 and 14-2 receives the ATM cell 26 in which the SIP L2-PDU 20 is mapped from the SNW 12 and then obtains, for example, SIP L3-PDU 40 (shown in FIG. 9 to be described later) based on ST 21c, SN 21d and SN 21e in the ATM cell 26, then recognizes SA (Source Address; sender address) 41e and DA (Destination Address; receiver address), and then routes the result to the subscriber's circuits 11-1 to 11-3 based on the SA 41e and DA 41d.

The SMDS-R 14-1 accommodates the subscriber's circuits 11-1 and 11-2. The SMDS-R 14-2 accommodates the subscriber's circuit 11-3. That is, the SMDS-R 14-1 distributes and inputs the ATM cell of which the normality is checked by the common unit 13A via the bus 10 and routes it to the subscriber's circuits 11-1 and 11-2 based on the sender information and receiver information regarding the ATM cell.

The SMDS-R 14-2 distributes and inputs the ATM cell of which the normality is checked by the common unit 13A via the bus 10 and routes it to the subscriber's circuit 11-3 based on the sender information and receiver information regarding the ATM cell.

The SMDS-Rs 14-1 and 14-2 are connected to the input and output routes d and d' of the SNW 12 via the common units 13A and 13B. The SMDS-Rs may be connected to an arbitrary single route.

(c) Signal aspect used in a SMDS switching apparatus:

Next, the signal aspects used in the SMDS switching apparatus will be described below.

The SIP L2-PDU 20 shown in FIG. 7 is a layer acting as an interface to a process peculiar to the SMDS service. As described before, the SIP L2-PDU 20 is a data format used when data is exchanged between the subscriber's circuits 11-1 to 11-3 and the subscriber's terminals 15-1 to 15-6.

In other words, the SIP L2-PDU 20 shown in FIG. 7 is formed of a SIP L2 header 21 of 7 octets, a segmentation unit or payload 22 acting as a data portion of 44 octets, and a SIP L2 trailer 23 of 2 octets.

The SIP L2 header 21 is formed of an ACF 21a of one octet and a NCI 21b of 4 octets, in addition to a ST 21c, a SN 21d, and a MID 21e having a total of 2 octets. The SIP L2 trailer 23 is formed of a PL 23a and a payload CRC 23b.

Each of the ACF 21a and NCI 21b controls the DQDB (Distributed Queue Dual Bus) being a logical interface to the SNIs 16-1 to 16-3. In concrete, when plural subscriber's terminals (e.g. 15-1 to 15-3) are connected to a single subscriber circuit (e.g. 11-1), data transmission to the subscriber circuit is arbitrated.

Moreover, when a message is transmitted or received between the subscriber's terminals, ST (Segment Type) 21c shows the kind of SIP L2-PDU forming the message.

There are four kinds of status ST 21c including BOM (Beginning of Message: first segment), COM (Continuation of Message: a segment except the first and last segments), EOM (End of Message: last segment), and SSM (Signal Segment Message: message completed by a single segment).

SN (Sequence Number) 21d shows the order of a SIP L2-PDU forming a message classified by the kind of message transmitted or received between subscriber's terminals. The SN 21d can construct SIP L2-PDU20 received by an address subscriber into an original SIP L3-PDU.

The range of SN 21d circulates between, for example, '0' to '15'. The initial value of the SN 21d (first segment number) is arbitrarily selected between '0' to '15' described above.

Moreover, MID (Message IDentifier) 21e shows the kind of message transmitted or received between subscribers.

The ATM cell 26 shown in FIG. 8 is a data format used when the SNW 12 exchanges data. Compared with SIP L2-PDU 20 shown in FIG. 7, the ATM cell 26 does not include ACF 21a and NCI 21b as header information, but includes an ATM header 24 formed of VPI/VCI (Virtual Path Identifier/Virtual Channel Identifier) 24a of one octet and HEC 24c of 4 octets.

Like the ATM payload in the SIP L2-PDU 20, the ATM payload 25 is formed of ST 21c, SN 21d, MID 21e, segmentation unit 22, PL 23a, and payload CRC 23b.

The SIP L3-PDU 40 shown in FIG. 9 is a data format recognized by the subscriber's terminals 15-1 to 15-6. When data is transmitted from the subscriber's terminals 15-1 to 15-6 to the subscriber's terminals 11-1 to 11-3, the SIP L3-PDU 40 is divided into SIP L2-PDU 20, as shown in FIG. 8.

Moreover, the SIP L3-PDU 40 is recognized by SMDS-Rs 14-1 and 14-2 and used to implement the SA screening (originating transfer regulating process) and DA screening process (destination transfer regulating process), together with the routing process.

The entire length of the SIP L3-PDU 40 is 160 octets. The SIP L3-PDU 40 is formed of the SIP L3-PDU header 41 having a data length of 36 octets, the payload 42 having a data length of 120 octets, and the SIP L3-PDU trailer 43 having a data length of 4 octets.

The SIP L3-PDU header 41 is formed of Rsvd 41a having a data length of one octet, BE tag 41b having a data length of one octet, BA size 41c having a data length of 2 octets, DA 41d having a data length of 8 octets, SA41e having a data length of 8 octets, and a data area 41f having a data length of 16 octets, arranged in order from the leading portion thereof (refer to X+, PL, X+, CIB, HEL, X+, and HE).

The data length of the payload 42 should not be limited only to 120 octets. If the data length is less than 9188 octets, SIP L3-PDU 40 can be formed to be an arbitrary data length.

As described above, MID 21e of the ATM cell 26 shows the kind of a message transferred or received between subscribers. However, the same value is allocated to all plural SIP L2-PDUs 20 each carrying a sole SIP L3-PDU 40 to show a SIP L2-PDU 20 forming originally a SIP L3-PDU 40. Thus, when plural SIP L3-PDUs 40 exist in the transmission line, a message can be rebuilt into SIP L3-PDU from SIP L2-PDU.

(d) Detail configuration of a SMDS switching apparatus according to the present embodiment:

Next, the detail configuration of a SMDS switching apparatus according to the present invention will be described below.

Figure 10:
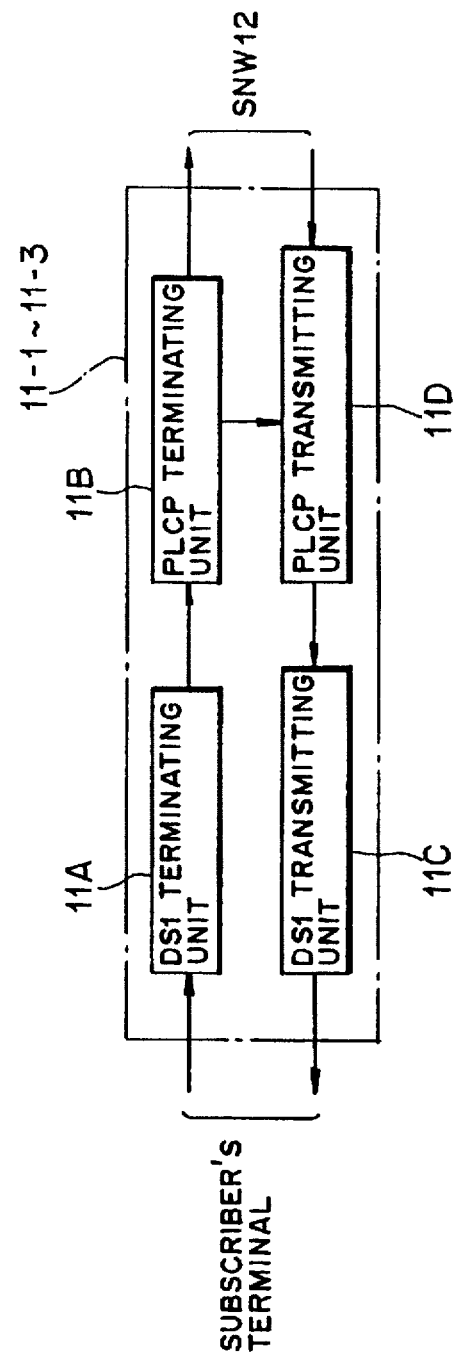
FIG. 10 is a block diagram illustrating in detail a subscriber's circuit according to an embodiment of the present invention.

Each of the subscriber's circuits 11-1 to 11-3, as shown in FIG. 10, includes in detail a DS1 terminating unit 11A, a PLCP terminating unit 11B, a DS1 transmitting unit 11C, and a PLCP transmitting unit 11D.

The DS1 (Digital Signal 1) terminating unit 11A terminates SNIs 16-1 to 16-3 in the direction of the transmission signal sent from the subscriber's terminals 15-1 to 15-3 to the subscriber's circuits 11-1 to 11-3.

In concrete, the DS1 terminating unit 11A converts bipolar signals from the subscriber's terminals 15-1 to 15-3 to a unipolar signal and implements a PCM code demodulation, extraction of a clock signal from a receiving DS1 transmission route, alarm detection or report regarding a DS1 interface, and extraction of a data signal from a DS1 frame.

In other words, the DS1 terminating unit 11A receives a DS1 signal acting as a transmission signal from the subscriber's terminals 15-1 to 15-3 and then extracts a signal in the format of SIP L2-PDU (SMDS Interface Protocol Level 2-Protocol Data Unit) 20 (refer to FIG. 7) corresponding to a upper layer signal, based on the DS1 signal.

Moreover, the PLCP (Physical Layer Convergence Procedure) terminating unit 11B in each of the subscriber's circuits 11-1 to 11-3 replaces information on SIP L2 header 21 in such a manner that the SNW 12 switches SIP L2-PDU 20 extracted in the DS1 terminating unit 11A to the SMDS-Rs 14-1 and 14-2 accommodating a subscriber's terminal as a sending source.

In concrete, the PLCP terminating unit 11B replace the areas ACF 21a and NCI 21b of SIP L2-PDU 20 (shown in FIG. 7) with the ATM header 24 (shown in FIG. 8). Thus the change is output as the ATM cell 26 formed of the ATM header 24 and ATM payload 25 to the SNW 12.

Figure 11:
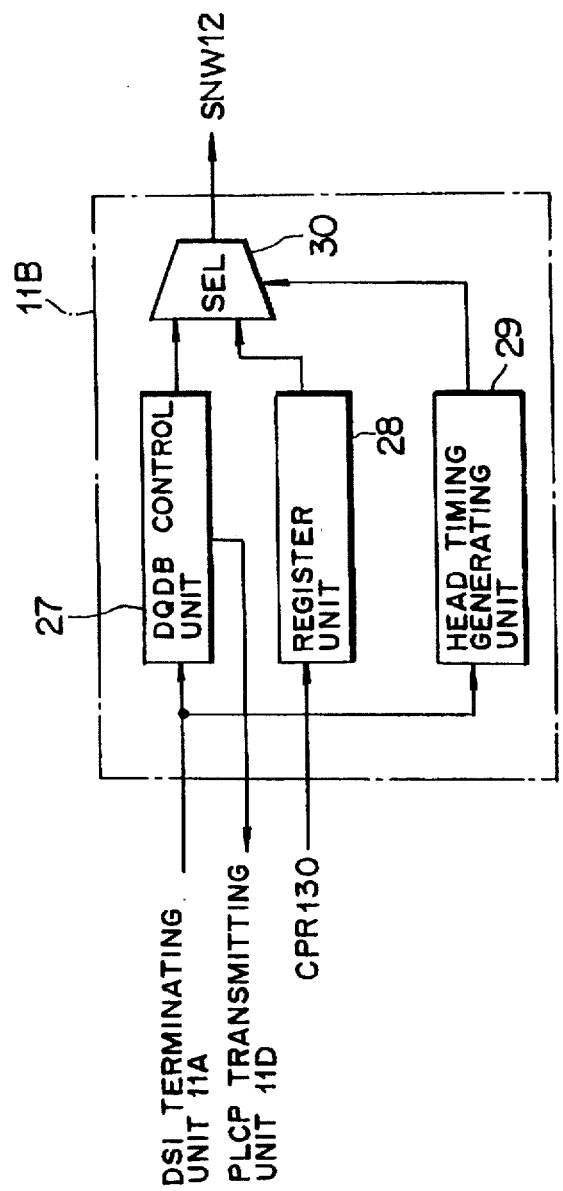
FIG. 11 is a block diagram illustrating the main portion of a subscriber's circuit according to an embodiment of the present invention.

The PLCP terminating unit 11B, as shown in detail in FIG. 11, consists of a DQDB processing unit 27, a register unit 28, a header timing generating unit 29, and a selector 30.

The DQDB processing unit 27 confirms that the field of each of ACF 21a and NCI 21b in the SIP L2-PDU 20 input from the DS1 terminating unit 11A is normal and then checks a request bit in the ACF 21a. When the request bit is set, the DQDB processing unit 27 requests transmitting an empty PDU to the PLCP transmitting unit 11D.

The register unit 28 holds the ATM header information of 5 octets to replace information on the areas ACF 21a and NCI 21b in the SIP L2 header 21, or a code HEC 24b detecting a bit error in the VPI/VCI 24a.

The ATM header information stored in the register unit 28 is input and held every kind (MID) of data sent from CPR 130 via the SPINF 120 shown in FIG. 29.

Figure 12:
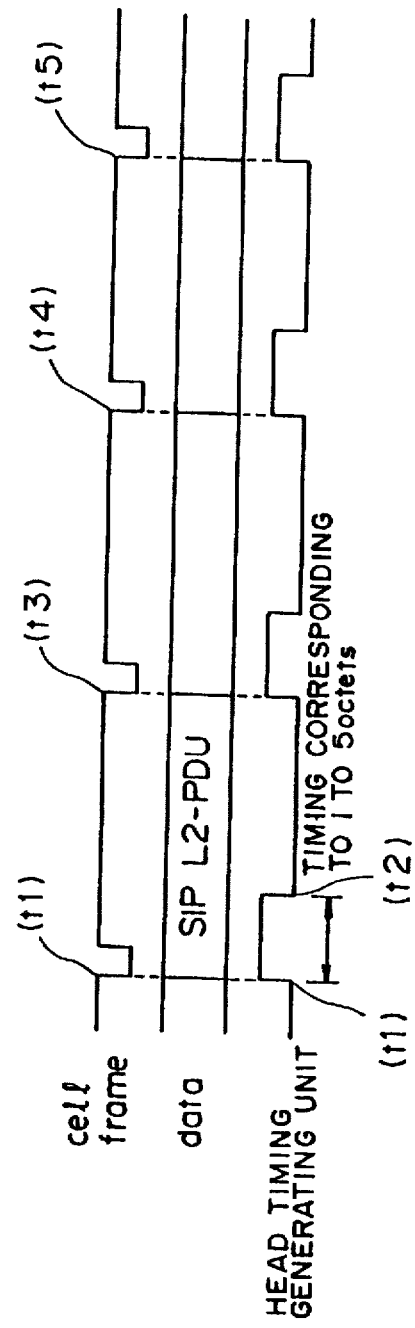
FIG. 12 is a timechart used for explaining the operation of the main portion of a subscriber's circuit according to the present invention.

The header timing generating unit 29, as shown in FIG. 12, produces as a selector signal a signal showing a data input timing (e.g. an H-level signal: refer to time (t1) to time (t2)) to the selector 30 only when the first to fifth data of the SIP L2-PDU 20 is input based on a cell frame pulse input (the leading signal of SIP L2-PDU 20; refer to time (t1), (t3), (t4), and (t5)) from the DS1 terminating unit 11A.

The selector (SEL) 30 outputs selectively information held in the register 28 only when data corresponding to the first to fifth octets of SIP L2-PDU 20 is input based on a selector signal from the header timing generating unit 29 and outputs selectively a signal from the DQDB processing unit 27 in other operations. Thus the ACF 21a and NCI 21b corresponding to the first to fifth octets of SIP L2-PDU 20 can be replaced to the ATM header 24.

For example, as shown with timechart in FIG. 12, a cell frame pulse and SIP L2-PDU 20 are sequentially input from the DS1 terminating unit 11A to the PLCP terminating unit 11B (refer to time (t1), (t3), (t4), and (t5)). The header timing generating unit 29 inputs the cell frame pulse from the DS1 terminating unit 11A and then outputs an H-level signal to the selector 30 only when data corresponding to the first to fifth octets of the SIP L2-PDU 20 is input (refer to time (t1) to (t2) of the timechart in FIG. 12).

In SIP L2-PDU 20 input at the time (t1), the selector 30 replaces ACF 21a and NCI 21b corresponding to the first to fifth octets of the SIP L2-PDU 20 from the DS1 terminating unit 11A with the ATM header 24 and then maps and outputs it as the ATM cell 26. In the same manner, the SIP L2-PDUs 20 input at the time (t3), (t4) and (t5) are output as the ATM cell 26.

The ATM cell 26 output from the PLCP terminating unit 11B is input to the SNW 12 formed as an ATM switch. However, the ATM cell 26 is switched to the common unit 13A accommodating the corresponding SMDS-Rs 14-1 and 14-2, based on VPI/VCI of the ATM header 24.

Moreover, the PLCP transmitting unit 11D in each of the subscriber's circuits 11-1 to 11-3 is input from the SNW 12 to the ATM cell 26. The ATM cell 26 is subjected to a process basically reversely to that of the PLCP terminating unit 11B described before, or the ATM cell 26 input from the SNW 12 is converted into a format of SIP L2-PDU 20 and outputs an empty SIP L2-PDU 20 according to a request from the PLCP terminating unit 11B.

Figure 13:
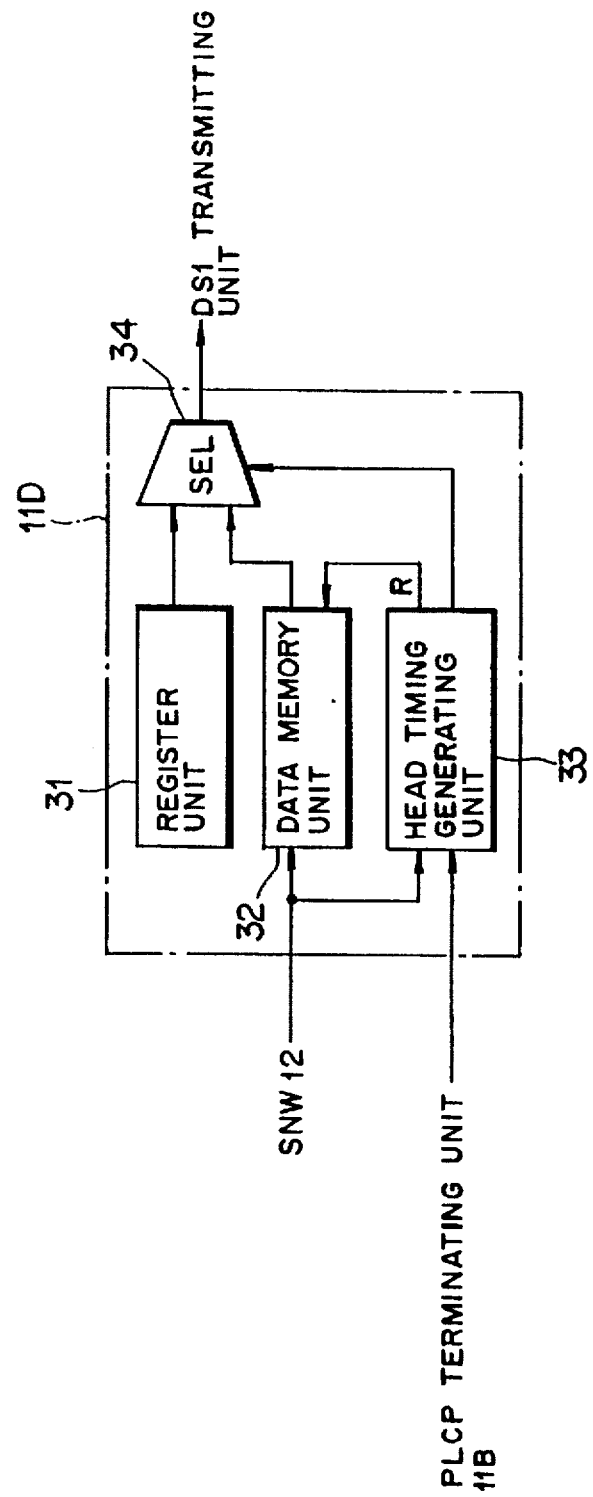
FIG. 13 is a block diagram illustrating the main portion of a subscriber's circuit according to the present invention.

The PLCP transmitting unit 11D, as shown in detail in FIG. 13, includes a register 31, a data memory unit 32, a header timing generating unit 33, and a selector 34.

The register unit 31 stores the values ACF 21a and NCI 21b each which replaces VPI/VCI/HEC as the ATM header 24 of the ATM cell 26. The ACF 21a and NCI 21b each having a constant value does not require setting data from the CPR 130 (refer to FIG. 29). The register unit 31 may be formed of a hardware configuration.

The data memory unit 32 holds the ATM cell 26 from the SNW 12. The data memory unit 32 acts as a waiting buffer to send an empty PDU when an empty SIP L2PDU 20 is transmitted in response to a request from the PLCP terminating unit 11B and the ATM cell to be transmitted from the SNW 12 is received.

The header timing generating unit 33 generates a timing corresponding to the first to fifth octets of the ATM cell in the frame from the SNW 12, like the header timing generating unit 29 described above. The selector 34 selectively outputs a signal from the register 31 or a signal from the data memory unit 32, based on the timing information.

Thus as to the ATM cell 26 input from the SNW 12, the selector 34 outputs the SIP L2-PDU 20 obtained by converting the ATM header 24 into the ACF 21a and NCI 21b.

The header timing generating unit 33 outputs always a reading signal to the data memory 32 in a normal state. When an empty cell transmission request is received from the PLCP terminating unit 11B, the header timing generating unit 33 ceases reading the timing data memory 32 transmitting a sole SIP L2-PDU 20, transmits the empty SIP L2-PDU 20, and thereafter reopens the reading of the data memory 32.

The PLCP transmitting unit 11D converts the ATM header 24 of the ATM cell 26 input from the SNW 12 into the format of SIP L2-PDU 20 by replacing it with the field of each of the ACF 21a and NCI 21b, and outputs an empty SIP L2-PDU 20 in response to a request from the PLCP terminating unit 11B.

The DS1 transmitting unit 11C in each of the subscriber's circuits 11-1 to 11-3 maps the SIP L2-PDU 20 created in the PLCP transmitting unit 11D to the physical layer of DS1. In concrete, the DS1 transmitting unit 11C implements a framing bit addition, a code conversion to a PCM (Pulse Code Modulation) code, and an electrical level conversion of a signal such as an uni-polar signal and a bipolar signal.

Figure 14:
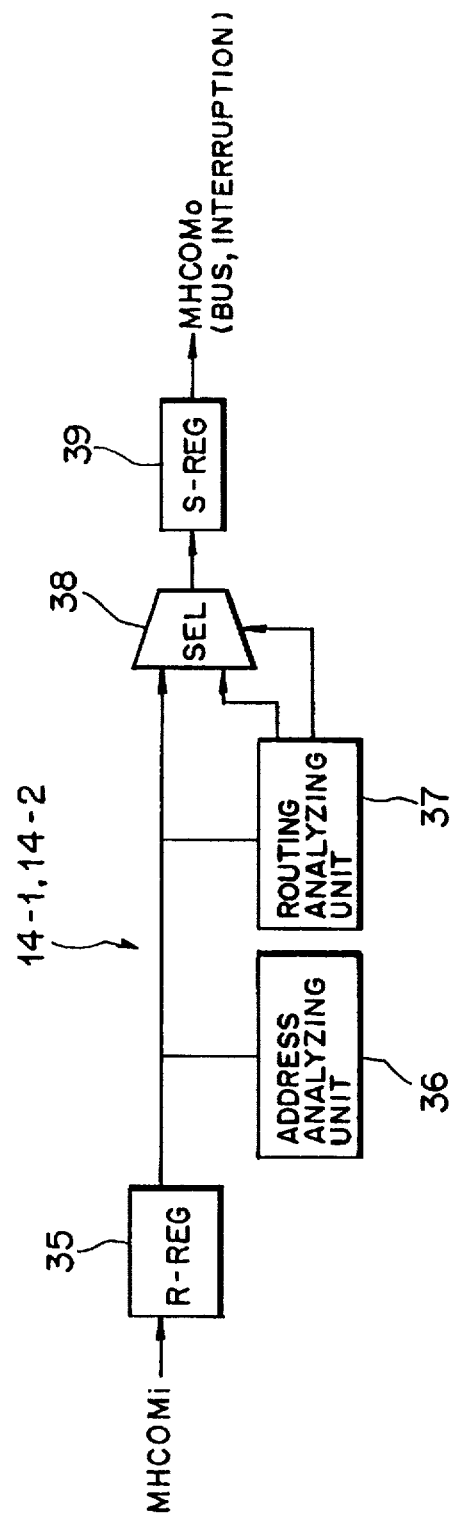
FIG. 14 is a block diagram illustrating in detail SMDS-R according to an embodiment of the present invention.

As described above, each of the SMDS-Rs 14-1 and 14-2 implements a routing operation based on sender information and receiver information regarding an ATM cell. However, as shown in detail in FIG. 14, each of the SMDS-R 14-1 and 14-2, as shown in detail in FIG. 14, includes a bus receiving unit 35, an address analyzing unit 36, a routing analyzing unit 37, a selector 38, and a bus transmitting unit 39.

The bus receiving unit (R-REG) 35 receives the ATM cell 26 input from the common unit 13A via the bus 10. The address analyzing unit 36 recognizes the SIP L3-PDU 40 (refer to FIG. 9) of the received ATM cell 26, based on the SN 21d and MID 21e, and analyzes whether or not the address of the SIP L3-PDU 40 (information recorded in DA 41d) is a subscriber's terminal accommodated in the self SMDS-R.

The address analyzing unit 36 maps the SIP L2-PDU 20 acting as the received ATM cell 26 with ST 21c, SN 21d, and MID 21e (e.g. as shown in FIGS. 15(a) to 15(d)) and then recognizes the result as SIP L3-PDU 40.

As described above, the ST 21c shows the kind of SIP L2-PDU forming a message which is transmitted or received between subscriber's terminals. The SN 21d shows the order of SIP L2-PDUs forming a message every kind of message. The MID 21e shows the kind of message transmitted or received between subscribers.

In this case, the MID 21e as a kind of message is "37". In SIP L2-PDU 20-1 being the first segment forming a message, as shown in FIG. 15(a), the ST 21c is BOM and the SN 21d is "4".

Figure 15:
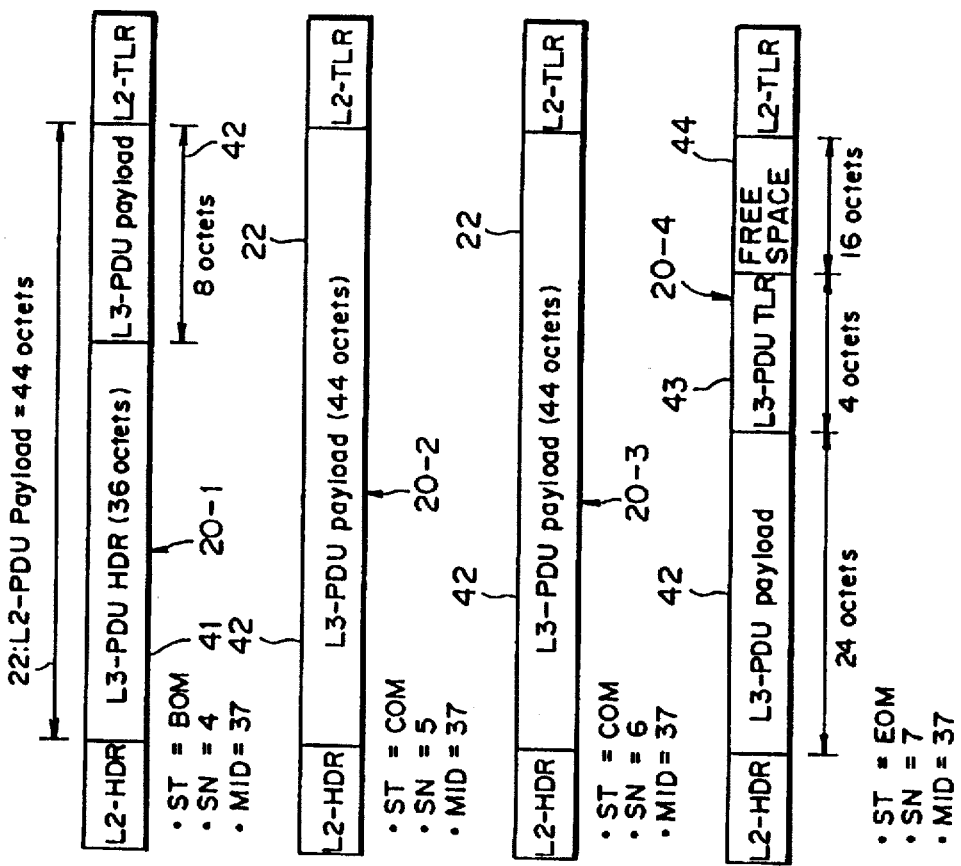
FIGS. 15(a) to 15(d) are diagrams each used for explaining the operation of SMDS-R according to an embodiment of the present invention.

Likewise, in SIP L2-PDU 20-2 as the second segment, as shown in FIG. 15(b), the ST 21c is COM and the SN 21d is '5'. In SIP L2-PDU 20-3 as the third segment, as shown in FIG. 15(c), the ST 21c is COM and the SN 21d is '6'. In SIP L2-PDU 20-4 as the final segment, as shown in FIG. 15(d), the ST 21c is EOM and the SN 21d is '7'.

By dividing SIP L3-PDU 40 of 160 octets, L2-PDU payload 22 of SIP L2-PDU 20-1 is formed of L3-PDU header 41 of 36 octets and L3-PDU payload 42 of 8 octets. L2-PDU payload 22 of SIP L2-PDU 20-2 is formed of L3-PDU payload 42 of 44 octets. L2-PDU payload 22 of SIP L2-PDU 20-3 is formed of L3-PDU payload 42 of 44 octets. L2-PDU payload 22 of SIP L2-PDU 20-4 is formed of L3-PDU payload 42 of 24 octets, L3-PDU trailer 43 of 4 octets, and an empty area 44 of 16 octets.

As described above, since the same value is allocated to plural SIP L2-PDUs 20 each carrying one SIP L3-PDU 40, MID 21e of the ATM cell 26 can be rebuilt from SIP L2-PDU 20 to SIP L3-PDU 40 even when plural SIP L3-PDUs 40 exist on the transmission line.

Figures 18A, 18B:
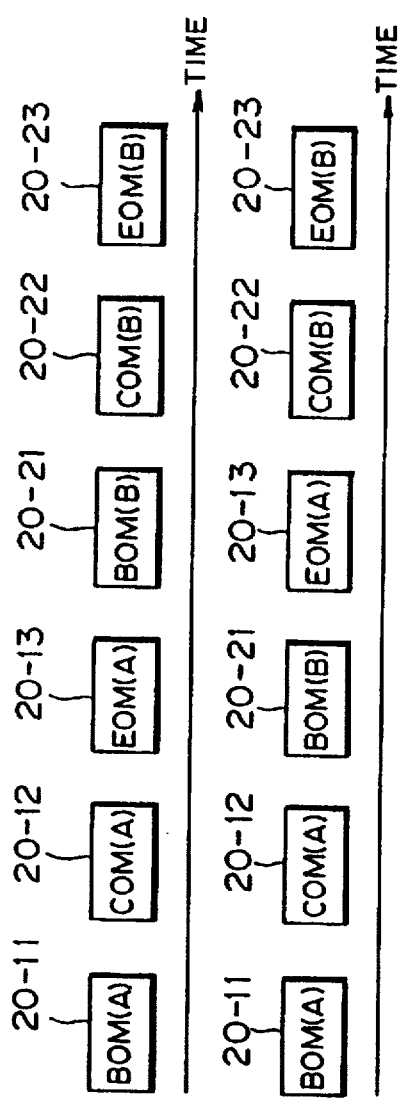
FIGS. 18(a) to 18(b) are diagrams each used for explaining the operation of SMDS-R according to an embodiment of the present invention.

For example, when SIP L2-PDUs 20-11 to 20-13 to which SIP L3-PDU 40-1 is mapped exists on the transmission line, as shown in FIG. 16, and SIP L2-PDUs 20-21 to 20-23 to which SIP L3-PDU 40-2 is mapped exists on the transmission line, as shown in FIG. 17, the sequential process can be performed without any trouble by transmitting the SIP L2-PDU 20-11 to 20-13 and 20-21 to 20-23 on the transmission line as shown in FIG. 18(a). However, when they are transmitted as shown in FIG. 18(b), SIP L3-PDU 40-1 and 40-2 coexist as their message.

In this case, the address analyzing unit 36 can rebuild SIP L3-PDUs 40-1 and 40-2 based on MID 21e acting as information regarding that respective segments belong originally to the SIP L3-PDU 40-1 or 40-2.

The address analyzing unit 36 of SMDS-R 14-1 includes a routing table 14-11 storing routing information (VPI/VCI information) corresponding to the address (DA) of each of subscriber's terminals 15-1 to 15-4 each accommodating the self SMDS-R 14-1, for example, as shown in FIG. 19.

Likewise, the address analyzing unit 36 in SMDS-R 14-2 includes the routing table 14-12, for example, as shown in FIG. 19. The routing table 14-12 stores routing information (VPI/VCI information) corresponding to the address (DA) of each of subscriber's terminals 15-5 to 15-6 each accommodating the self SMDS-R14-2.

When the ATM cell 26 acting as SIP L2-PDU is received from the common unit 13A, as shown with the flowchart in FIG. 21 (YES route in step A1) and ST 21c of the ATM cell is BOM or SSM, the address analyzing unit 36 in each of the SMDS-Rs 14-1 and 14-2 refers to DA 41e accommodated in the BOM or SSM, and then analyzes whether or not the address of the ATM cell is the subscriber's terminal accommodated by itself.

However, when ST 21c of the ATM cell 26 received is COM or EOM, the ATM cell 26 is discarded because it does not accommodate SA/DA. Then the process of the address analyzing unit 36 is completed (from step A2 to step A1).

When the address analyzing unit 36 of each of the SMDS-Rs 14-1 and 14-2 judges that SIP L3-PDU 40 is to be accommodated by itself (YES route in step A3), the VPI/VCI information corresponding to the DA of the routing tables 14-11 and 14-12 is registered into the on-process message table in the routing analyzing unit 37, for example, as shown in FIG. 22, together with MID 21e (step A4).

The address analyzing unit 36 performs the DA screening process (destination transfer regulating process) and SA screening (originating transfer regulating process) by retrieving the routing tables 14-11 and 14-12.

As described above, the routing analyzing unit 37 of each of the SMDS-Rs 14-1 and 14-2 includes the on-process message table 37A (refer to FIG. 22) in which MID 21e is registered together with the corresponding VPI/VCI information when the DA 41d of the ATM cell received is to be accommodated in SNDS-Rs 14-1 and 14-2 by itself. The routing analyzing unit 37 implements a reading access according to the on-process message table 37A.

The selector (SEL) 38 replaces the header information of the received SIP L2-PDU 20 with the VPI/VCI being the on-process message table retrieving result. The selector (SEL) 38 also selectively outputs the VPI/VCI retrieved by the routing analyzing unit 37 at the timings of the first to fifth octets of the ATM cell 26 in response to a select signal showing the first to fifth octets of the ATM cell 26 which is produced by the routing analyzing unit 37 and outputs the received ATM cell 26 without any change in other operations.

The bus transmitting unit (S-REG) 39 stores temporarily the ATM cell 26 converted into header information. The bus transmitting unit 39 is formed of, for example, a register. The bus transmitting unit 39 outputs the ATM cell 26 stored to the common unit 13B by interrupting the common 13B after a completion of a data storage for one ATM cell.

The output route deciding unit that decides an output route using the SNW 12 is formed of the bus receiving unit 35, the address analyzing unit 36, the routing analyzing unit 37, the selector 38, and the SNW 12.

As described above, the common unit 13A has an interface function of checking the normality of the ATM cell 26 when the ATM cell is output from the output route d of SNW 12 to the MDS-Rs 14-1 and 14-2. This feature allows the load of the SMDS-Rs 14-1 and 14-2 in the rear stage to be reduced.

The ATM cell 26 completely checked in the normality is distributed and output to the bus receiving unit 35 of the SMDS-Rs 14-1 and 14-2 via the bus 10, as shown in FIG. 23.

Figure 24:
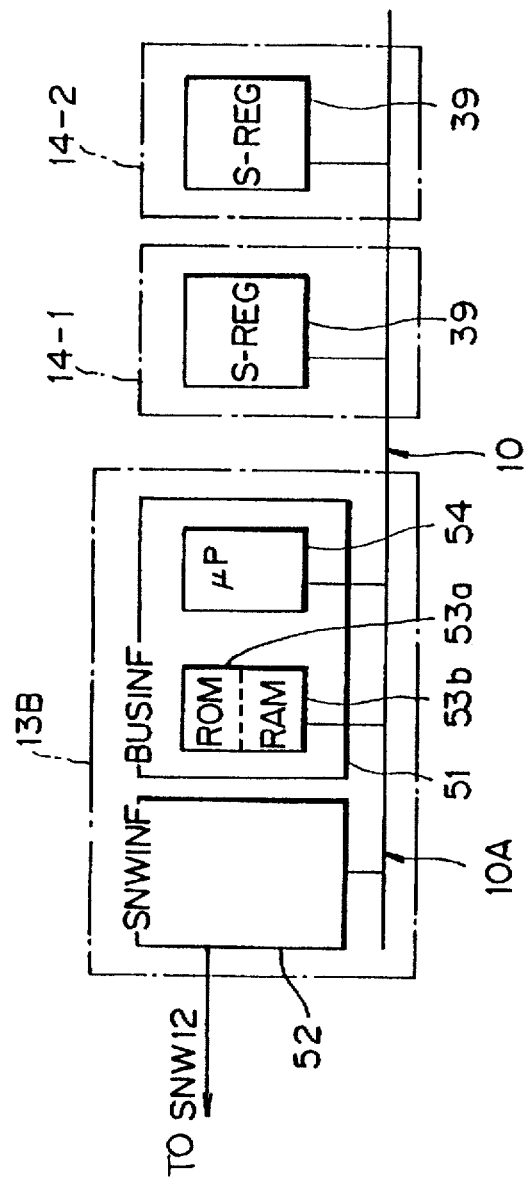
FIG. 24 is a block diagram illustrating the common portion according to an embodiment of the present invention.

The common unit 13B acts as an interface when a signal is output from the SMDS-Rs 14-1 and 14-2 to the output route d' of SNW 12. However, as shown in detail in FIG. 24, the common unit 13B is formed of a bus interface (BUSINF) 51 and the SNW interface (SNWINF) 52.

The bus interface 51 includes a ROM 53a, a RAM 53b, and a microprocessor (μP) 54. The microprocessor 54 is connected between the bus transmitting units 39 in the SMDS-Rs 14-1 and 14-2 via the bus 10 and via the interrupting line to receive interruption from the SMDS-Rs 14-1 and 14-2.

Moreover, the microprocessor 54 is connected to the ROM 53a, the RAM 53b, and the SNW interface 52 via the microprocessor bus 10A. This feature allows the microprocessor 54 to recognize data stored in the bus transmitting unit 39 in each of the SMDS-Rs 14-1 and 14-2, together with the ROM 53a, the RAM 53b, and the SNW interface 52.

Figure 25:
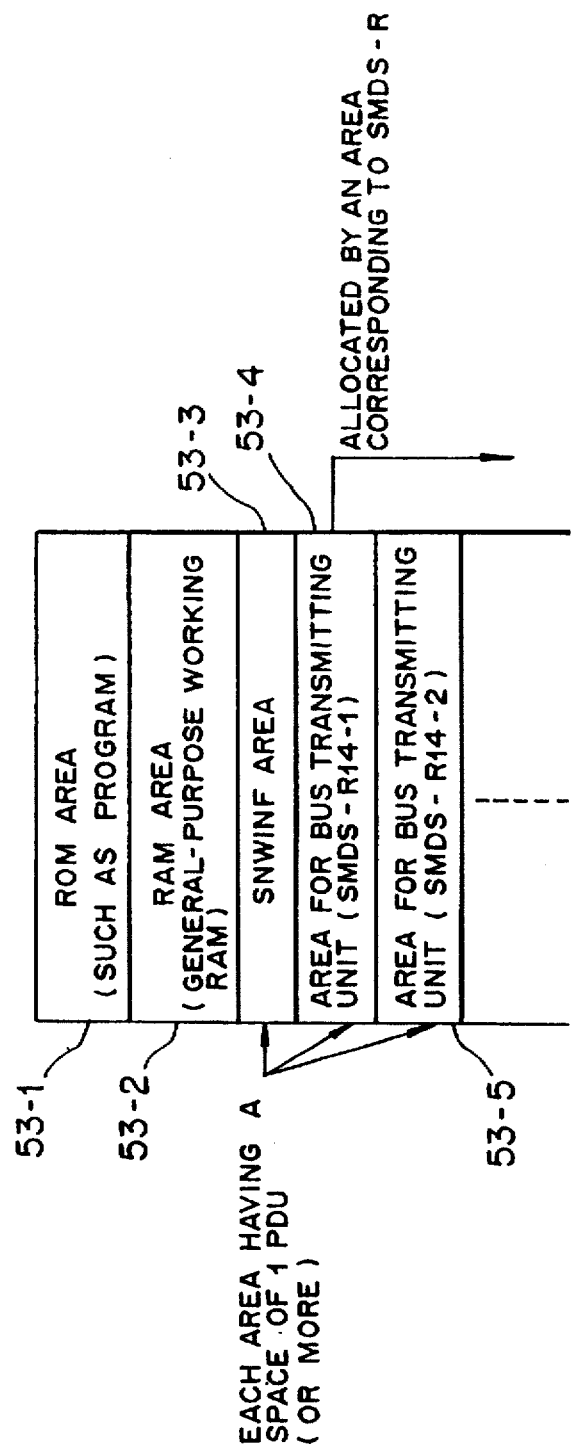
FIG. 25 is a block diagram used for explaining the operation of the main portion of the common portion according to an embodiment of the present invention.

For example, as shown in FIG. 25, the microprocessor 54 includes mapping areas including the ROM area 53-1 acting as a memory area in which programs are written, the RAM area 53-2 acting as a general purpose working area, the SNW interface area 53-3, the bus transmitting area 53-4 of the SMDS-R 14-1, and the bus transmitting area 53-4 of the SMDS-R 14-2.

The areas (in this case, the SNW interface area 53-3, the bus transmitting area 53-4 of the SMDS-R 14-1, and the bus transmitting area 53-4 of the SMDS-R 14-2) except the ROM area 53-1 and RAM area 53-2 have respectively an area where the information amount of at least one SIP L2-PDU can be stored.

Figure 5:
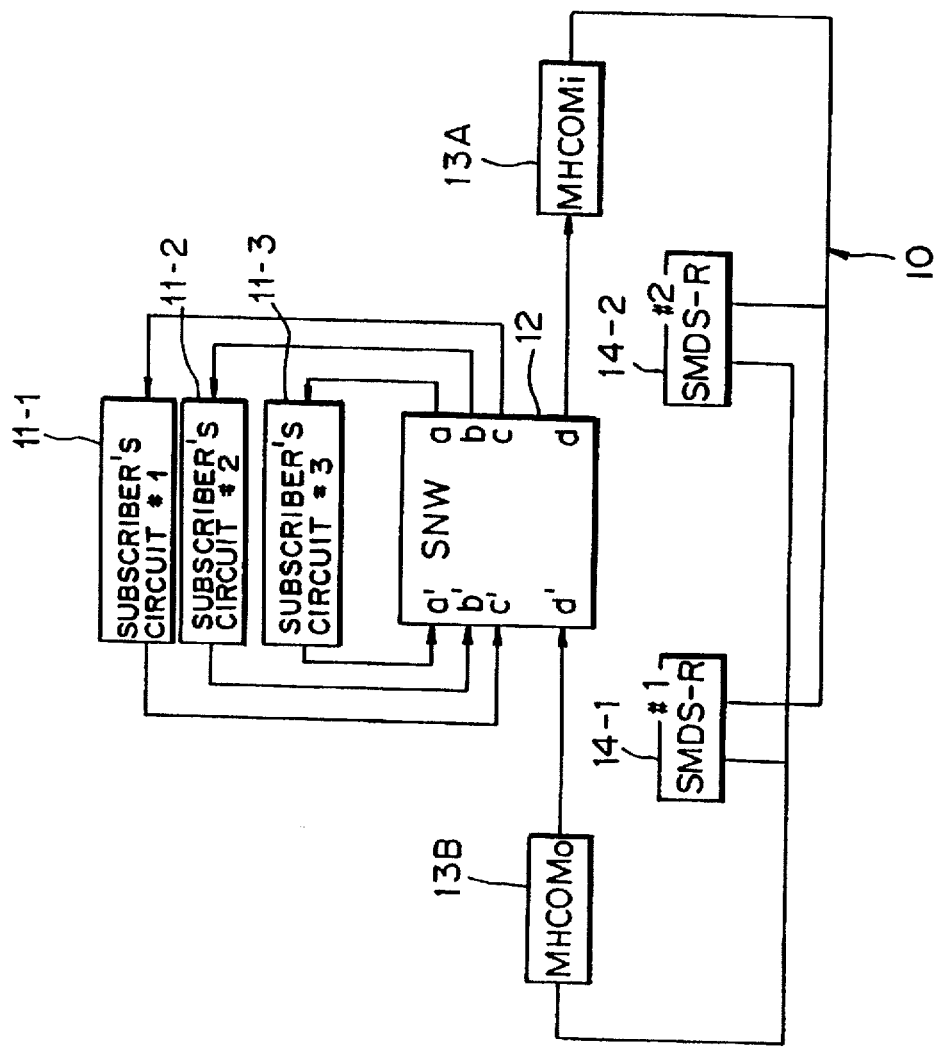
FIG. 5 is a block diagram showing a SMDS switching apparatus according to an embodiment of the present invention.

The present embodiment, as shown in FIG. 5 or 6, includes two SMDS-Rs 14-1 and 14-2. As shown in FIG. 25, two areas (refer to numerals 53-4 and 53-5) corresponding to the SMDS-Rs 14-1 and 14-2. However, with two SMDS-Rs or more, the area is allocated according to the number of SMDS-Rs.

The SNW interface 52 interfaces with the ROM 53a, RAM 53b, and SNW 12 necessary to the operation of the microprocessor 54. The bus 10 connects the ROM 53a with the SNW 12 and the RAM 53b with the SNW 12.

The SNW interface 52, as shown in detail in FIG. 26, consists of a PDU register 55, an empty cell pattern register 56, a 53 octet counter 57, an interrupting control unit 58, and the selector 59.

The PDU register 55 stores temporarily transmission data from the bus transmitting unit 39 in each of the SMDS-Rs 14-1 and 14-2. The PDU register 55 is formed of, for example, a DRAM.

The PDU register 55 receives the 53 periodic counter output from the 53 octet counter 57 via the port 55A. The PDU register 55 also implements a writing access at the port 55B to transfer transmission PDU data (an ATM cell as SIP L2-PDU) using the microprocessor 54 and always reads transmission data out of the bus transmitting unit 39 in each of the SMDS-Rs 14-1 and 14-2 by setting the counter output from the 53 octet counter 57 as an address.

The port 55B at which transmission data is input from the bus transmitting unit 39 is viewed on the microprocessor bus 10A. The microprocessor 54 can recognize the port 55B (refer to numeral 53-3 in FIG. 25).

Where there is no PDU to be transmitted to the PDU register 55 (that is, the microprocessor 54 handles no transfer completion interruption), the empty cell pattern register 56 holds the fixed pattern representing an empty cell to be transmitted to the SNW 12.

The address interruption of the empty cell pattern register 56 is the same as that in the port 55A of the PDU register 55. Like the address interruption sent to the PDU register 55, the counter output is always read from the 53 octet counter 57.

The selector (SEL) 59 receives the output from the PDU register 55 and the output from the empty cell pattern register 56 and outputs selectively any one of them.

In concrete, where there is a PDU to be transmitted (that is, there is a transfer completion interruption from the microprocessor 54), the selector 59 outputs selectively data from the PDU register 55 for a period of 1PDU (53 octets). Where there is no PDU to be transmitted, the selector 59 outputs selectively data from the empty cell pattern register 56.

The interruption processing unit 58 outputs a select signal in response to a transfer completion interruption from the microprocessor 54 in such a manner that the selector 59 outputs selectively data from the PDU register 55 during one PDU (53 octets) from the cell timing (a cell frame created by the 53 octet counter 57) immediately after the reception of the interruption.

Figure 27:
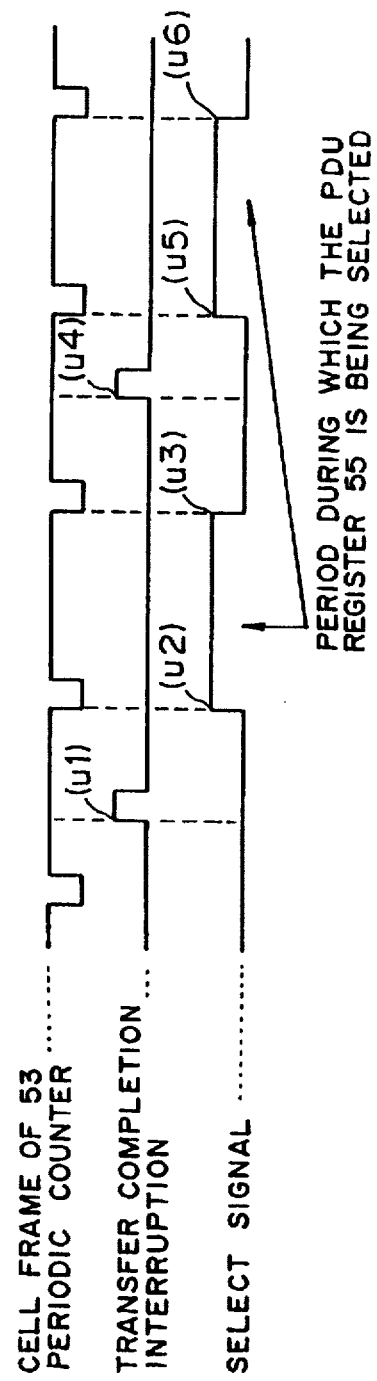
FIG. 27 is a timechart used for explaining the operation of the main portion of the common portion according to an embodiment of the present invention.

Namely, the interruption processing unit 58, for example, as shown with the timechart in FIG. 27, outputs an H-level signal as a select signal to the selector 59 during one PDU (the period between the time u2 and the time u3 or between the time u5 and the time u6) from the cell timing immediately after a transfer completion interruption from the microprocessor 54 has been accepted (refer to the time u1 or u4). Thus, the selector 59 outputs selectively data from the PDU register 55.

The SMDS switching system according to an embodiment of the present invention and having the above-described configuration will be described below.

Where the subscriber's terminal 15-2 acting as a transmitting terminal transmits a packet as a message to the subscriber's terminal 15-5 acting as a receiving terminal, a bipolar signal subjected to a coding process is output to the subscriber's circuit, based on SIP L2-PDU 20 (refer to FIG. 7) obtained by dividing SIP L3-PDU 40 (refer to FIG. 9) forming a message every 44 octets (refer to the signal (S1) in FIG. 6).

In the subscriber's circuit 11-1 to which SIP L2-PDU 20 is input from the subscriber's terminal 15-2, the DS1 terminating unit 11A implements a signal level converting process to convert a bipolar signal to a unipolar signal. By demodulating a PCM code, extracting a clock signal from the received DS1 transmission route, detecting and reporting alarm regarding a DS1 interface, or extracting a data signal from a DS1 frame, the terminating unit 11A also terminates SNI 16-1 in the transmission signal direction and then extracts a signal in a format of SIP L2-PDU 20.

After the DS1 terminating unit 11A extracts SIP L2-PDU 20, the PLCP terminating unit 11B replaces areas ACF 21a and NCI 21b as the header information of SIP L2-PDU 20 with the ATM header 24 and then outputs the result as the ATM cell 26 (refer to FIG. 8) to the SNW 12.

The SNW 12 receives the ATM cell 26 from the subscriber's circuit 11-1 via the input route a' and implements a switching operation according to the information of the ATM header 13A, thus outputting it to the common unit 13A via the output route d (refer to the signal (S2) in FIG. 6).

When the ATM cell 26 is output from the output route d of the SNW 12 to the SMDS-Rs 14-1 and 14-2, the common unit 13A checks the normality of the ATM cell 26 and then distributes and outputs the checked ATM cell 26 to SMDS-Rs 14-1 and 14-2 via the bus 10.

Each of the SMDS-Rs 14-1 and 14-2 implements the SA screening (originating transfer regulating process) and the DA screening (destination transfer regulating process), in addition to a routing process by analyzing sender information and receiver information each regarding the ATM cell, or by recognizing SIP L3-PDU 40 based on the ATM cell from the common unit 13A.

That is, the bus receiving unit 35 in each of the SMDS-Rs 14-1 and 14-2 receives the ATM cell 26 input from the common unit 13A via the bus 10. With the ST 21c of the received ATM cell 26 which is BOM or SSM as shown with the flowchart in FIG. 21, the address analyzing unit 36 refers the routing tables 14-11 and 14-12 based on the DA 41e accommodated in the BOM or SSM and then analyzes whether or not the address of the ATM cell is a subscriber's terminal accommodated by itself (from step A1 to step A3 via YES route and the step A2).

With the ST 21c of the received ATM cell 26 being COM and EOM, the ATM cell 26 does not accommodate SA/DA. Hence the ATM cell 26 is discarded. The process in the address analyzing unit 36 is completed (from step A2 to step A1).

The address analyzing unit 36 in the SMDS-R 14-1 judges that the DA 41d as an address is not one to be accommodated by itself because the DA 41d of the SIP L3-PDU 40 is not hit. Hence the process is completed by discarding the frame (NO route in step A3).

The routing table 14-11 differs from the routing table 102A existing in the SMDS-S shown in FIGS. 30 and 31. The entry does not exceed the total number of SMDS subscribers accommodated in the SNIs 16-1 and 16-2 in the SMDS-R 14-1. It is not important whether data is hit or not. That retrieving the table at an arrival of a message results in no hit means the SMDS-R 14-1 accommodating no message's address subscriber.

The address analyzing unit 36 in the SMDS-R 14-2 judges that the DA 41d of SIP L3-PDU 40 corresponds to one accommodated by itself because DA 41d of SIP L3-PDU 40 is hit (YES route in step A3). The VPI/VCI information corresponding to the DA of the routing table 14-12, as shown in FIG. 22, is registered to the on-process message table 37A in the routing analyzing unit 37, together with MID 21e.

Each of the SMDS-Rs 14-1 and 14-2 implements the DA screening operation according to the receiver's address as well as the SA screening operation.

The routing analyzing unit 37 implements a reading access according to the on-process message table 37A.

The selector 38 outputs selectively VPI/VCI, based on the select signal showing the first to fifth octet of the ATM cell 26 created by the routing analyzing unit 37. The VPI/VCI is retrieved by the routing analyzing unit 37 with the timing of the first to fifth octet of the ATM cell 26. The selector 38 outputs the received ATM cell 26 in other operations without any change.

The bus transmitting unit (S-REG) 39 stores temporarily the ATM cell 26 of which the header information is converted and then interrupts the common unit 13B when data for one ATM cell has been completely stored, thus outputting the ATM cell 26 stored to the common unit 13B.

The microprocessor 54 in the common unit 13B interrupted recognizes the SMDS-R interrupted, and then transfers the PDU data stored in the bus transmitting unit 39 of the corresponding SMDS-R to the PDU register 55 of the SNW interface 52.

The microprocessor 54 recognizes the transfer status of the PDU to the PDU register while it subjects the interruption control unit 58 in the interface 52 to a transfer completion interruption when the transfer has been completed.

The interruption control unit 58 to which the transfer completion interruption has been received outputs a select signal to the selector 59 and then selectively outputs data from the PDU register 55 during one PDU (53 octets) from the cell timing immediately after the interruption reception.

The ATM cell 26 in which the header information from the common unit 13B is converted is input via the input route d' of the SNW 12 and then switched based on the converted header information, thus being transferred to the subscriber's circuit 11-3 via the output route c (refer to the signal (S3) in FIG. 6).

When the subscriber's circuit 11-3 receives the ATM cell 26 switched by the SNW 12, the PLCP transmitting unit 11D converts the ATM header 24 of the ATM cell 26 input from the SNW 12 into the format of SIP L2-PDU 20 by replacing it with the field of each of ACF 21a and NCI 21b and then outputs an empty SIP L2-PDU 20 according to a request from the PLCP terminating unit 11B (refer to the signal (S4) in FIG. 6).

Thus, the subscriber's terminal 15-2 acting as a transmitting terminal can transmit a message to the subscriber's terminal 15-5 acting as a receiving terminal.

As described above, according to the SMDS switching apparatus of an embodiment of the present invention, the SMDS-Rs 14-1 and 14-2 are connected in parallel via a single bus 10 to receive an ATM cell from the SNW 12 and to analyze sender information and receiver information each regarding the ATM cell input. Hence only the tag adding process that introduce a message to the route accommodating the SMDS-Rs 14-1 and 14-2 is needed as the originating process. This feature leads to neglecting the SMDS-S and minimizing the hardware scale. There is an advantage in that the device forming cost can be reduced.

Moreover, the one-time routing analysis of the SMDS-Rs 14-1 and 14-2 can contribute to a high processing speed because it is unnecessary that the originating processing units 102-1 and 102-2 and the destination processing unit 103-1 and 103-2 analyze the same routing twice to divide the SNIs 106 to 106-3, as shown in FIGS. 30 and 31.

When the routing table 102A of each of the originating processing units 102-1 and 102-2 is not hit, it is not needed to perform a process in which a traffic with very high burst occurs simultaneously, including transmitting the corresponding messages to all the destination processing units 103-1 and 103-2. Hence there is an advantage in that the traffic of the SNW 12 can be properly controlled.

The routing table 10411 in the SMDS-R 14-1 and the routing table 14-12 in the SMDS-R 14-2 hold respectively only information regarding the addresses of the subscriber's terminals 15-1 to 15-6 accommodated by themselves. The capacity with a fixed value can be realized only by hardware. Hence the processing speed can be improved because of no use of software.

The SMDS-Rs 14-1 and 14-2 can implement an originating transfer regulating process and a destination transfer regulating process, similar to the originating process and destination process (refer to numerals 102-1 and 102-2 and 103-1 and 103-2) in FIGS. 30 and 31. Hence the originating process can be simplified. No need of the SMDS-S allows the small-sized hardware scale. There is an advantage in that the system forming cost can be reduced.

Each of the SMDS-Rs 14-1 and 14-2 holds only information regarding the address of the subscriber's terminals 15-1 to 15-6 accommodated by itself. Hence this configuration can easily deal with an increased number of subscribers, for example, by increasing the memory capacity of each of the SMDS-Rs 14-1 and 14-2 and additionally increasing the SMDS-Rs.

Figure 28:
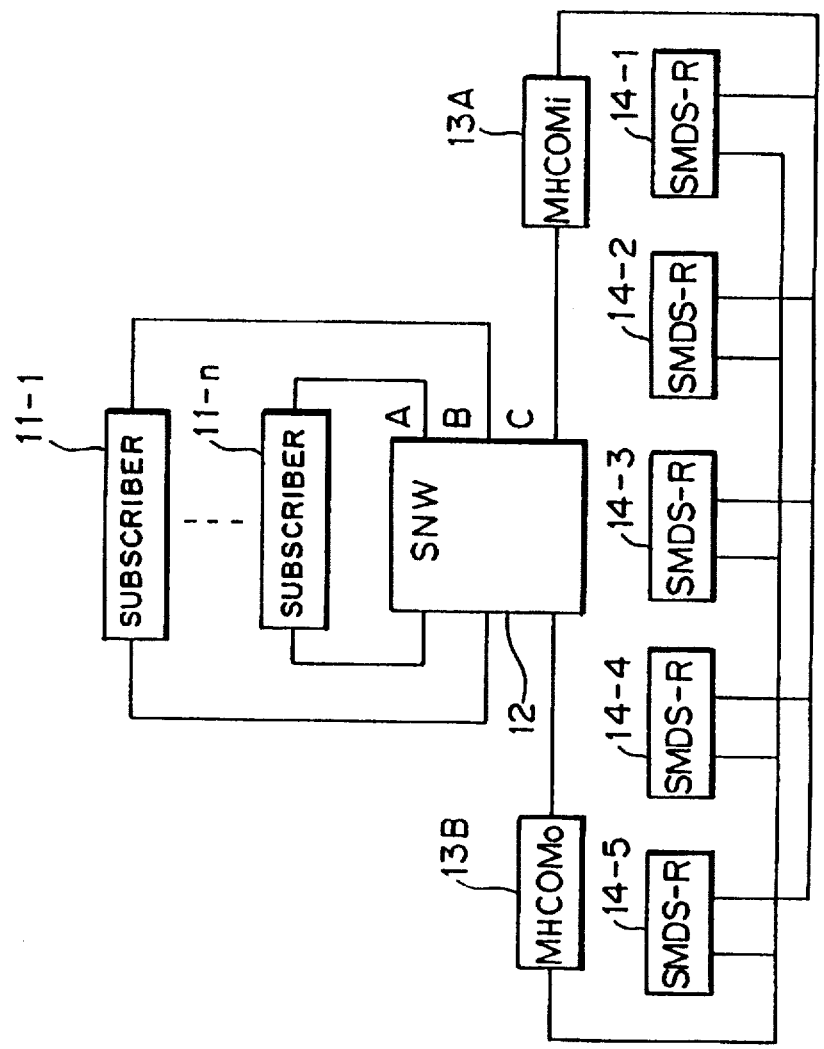
FIG. 28 is a block diagram illustrating a SMDS switching system according to another embodiment of the present invention.

(e) Others:

In the embodiment described above, the subscriber's terminals 15-1 to 15-6 are accommodated in any one of three subscriber's circuits 11-1 to 11-3 and two SMDS-Rs 14-1 and 14-2 are arranged. However, the present invention should not be limited to only the embodiments. For example, as shown in FIG. 28, with n subscriber's circuits 11-1 to 11-n connected to the SNW 12, the SMDS-R can be arbitrarily arranged (e.g. as five SMDS-Rs 14-1 to 14-5). Needless to say, this configuration has the function and effect similar to those in the above-mentioned embodiment.

In the above-described embodiment, the SMDS-Rs 14-1 and 14-2 are arranged in parallel via the single bus. However, the present invention should not be limited only to the embodiment. Connecting serially the SMDS-Rs 14-1 and 14-2 allows at least the originating process to be simplified. No need of the SMDS-S acting as an originating process can reduce the hardware scale, whereby the device forming cost can be reduced.

In the above-descried embodiment, the common units 13A and 13B check the normality of the fixed-length cell. The present invention should not be limited only to the embodiment. Even if the normality is not checked in the absence of the common units 13A and 13B, it is not needed to arrange the SMDS-S acting as at least an originating process. Hence the hardware scale can be reduced so that the device forming cost can be reduced.

In the above-described embodiment, each of the SMDS-Rs 14-1 and 14-2 implements an address conversion based on the routing information stored in the routing tables 14-11 and 14-12. However, other address converting methods can be adopted to the present invention. The simplified originating process can neglect SMDS-S acting as an originating processing unit, thus leading to the small hardware scale.

In the present embodiment described above, the SMDS-Rs 14-1 and 14-2 implements an originating transfer regulating process and a destination transfer regulating process. However, at least the originating process can be simplified without performing the above-described processes. No need of the SMDS-S arranged as an originating unit allows the small-sized hardware scale.

In the above-described embodiment, the SNW 12 is formed of an ATM switch. However, the present invention should not be limited only to the embodiment. For example, a network (switch) that can switch directly, for example, the SIP L2-PDU can be used as the SNW. This configuration can enjoy the same advantage as that in the above-mentioned embodiments.

What is claimed is:

1. A switched multi-megabit digital service switching apparatus for providing switching operations between local area networks in a connectionless mode, comprising:

plural subscriber's circuits, each of said plural subscriber's circuits accommodating at least one subscriber's terminal which terminates an interface with one of said local area networks and forms said local area networks;

an automatic routing selection switch connected to said plural subscriber's circuits, said automatic routing selection switch receiving a fixed-length cell formed of a logic channel information portion and a data portion and selecting automatically an output route for said fixed-length cell, based on information in said logic channel information portion; and an analyzing unit receiving the fixed-length cell sent from said automatic routing selection switch and then analyzing sender information and receiver information each regarding said fixed-length cell.

2. A switched multi-megabit digital service switching apparatus for providing switching operations between local area networks in a connectionless mode, comprising:

plural subscriber's circuits, each of said plural subscriber's circuits accommodating at least one subscriber's terminal which terminates an interface with one of said local area networks and forms said local area networks;

an automatic routing selection switch connected to said plural subscriber's circuits, said automatic routing selection switch receiving a fixed-length cell formed of a logic channel information portion and a data portion and selecting automatically an output route for said fixed-length cell, based on information in said logic channel information portion;

an analyzing unit receiving the fixed-length cell sent from said automatic routing selection switch and then analyzing sender information and receiver information each regarding said fixed-length cell; and a normality checking unit checking the normality of a transmit/receive fixed-length cell to said automatic routing switch.

3. A switched multi-megabit digital service switching apparatus for providing switching operations between local area networks in a connectionless mode, comprising:

plural subscriber's circuits, each of said plural subscriber's circuits accommodating at least one subscriber's terminal which terminates an interface with one of said local area networks and forms said local area networks;

an automatic routing selection switch connected to said plural subscriber's circuits, said automatic routing selection switch receiving a fixed length cell formed of a logic channel information portion and a data portion and selecting automatically an output route for said fixed-length cell, based on information in said logic channel information portion; and at least one analyzing unit connected in parallel between an input route and an output route of said automatic routing selection switch via a single route bus to analyze sender information and receiver information each regarding said fixed-length cell.

4. A switched multi-megabit digital service switching apparatus for providing switching operations between local area networks in a connectionless mode, comprising:

plural subscriber's circuits, each of said plural subscriber's circuits accommodating at least one subscriber's terminal which terminates an interface with one of said local area networks and forms said local area networks;

an automatic routing selection switch connected to said plural subscriber's circuits, said automatic routing selection switch receiving a fixed length cell formed of a logic channel information portion and a data portion and selecting automatically an output route for said fixed-length cell, based on information in said logic channel information portion;

at least one analyzing units connected in parallel between an input route and an output route of said automatic routing switch via a single route bus to analyze sender information and receiver information each regarding said fixed-length cell;

a first normality checking unit for checking the normality of a fixed-length cell in the output route of said automatic routing selection switch; and a second normality checking unit for checking the normality of a fixed-length cell in the input route of said automatic routing selection switch.

5. The switched multi-megabit digital service switching apparatus according to claim 1, wherein said analyzing unit comprises:

a routing table for storing routing information in response to receiver information regarding said fixed-length cell; and an output route deciding unit for deciding an output route using said automatic routing selection switch, based on the routing information stored into said routing table.

6. The switched multi-megabit digital service switching apparatus according to claim 2, wherein said analyzing unit comprises:

a routing table for storing routing information in response to receiver information regarding said fixed-length cell; and an output route deciding unit for deciding an output route using said automatic routing selection switch, based on the routing information stored into said routing table.

7. The switched multi-megabit digital service switching apparatus according to claim 3, wherein said analyzing unit comprises:

a routing table for storing routing information in response to receiver information regarding said fixed-length cell; and an output route deciding unit for deciding an output route using said automatic routing selection switch, based on the routing information stored into said routing table.

8. The switched multi-megabit digital service switching apparatus according to claim 4, wherein said analyzing unit comprises:

a routing table for storing routing information in response to receiver information regarding said fixed-length cell; and an output route deciding unit for deciding an output route using said automatic routing selection switch, based on the routing information stored into said routing table.

9. The switched multi-megabit digital service switching apparatus according to claim 1, further comprising a transfer regulating unit that regulates transferring said fixed-length cell to said automatic routing selection switch when analyzing said sender information regarding said fixed-length cell by said analyzing unit results in finding said fixed-length cell sent from an inappropriate sender and regulates transferring said fixed-length cell to said automatic routing selection switch when analyzing said receiver information regarding said fixed-length cell by said analyzing unit results in finding said fixed-length cell sent from an inappropriate receiver.

10. The switched multi-megabit digital service switching apparatus according to claim 2, further comprising a transfer regulating unit that regulates transferring said fixed-length cell to said automatic routing selection switch when analyzing said sender information regarding said fixed-length cell by said analyzing unit results in finding said fixed-length cell sent from an inappropriate sender and regulates transferring said fixed-length cell to said automatic routing selection switch when analyzing said receiver information regarding said fixed-length cell by said analyzing unit results in finding said fixed-length cell sent from an inappropriate receiver.

11. The switched multi-megabit digital service switching apparatus according to claim 3, further comprising a transfer regulating unit that regulates transferring said fixed-length cell to said automatic routing selection switch when analyzing said sender information regarding said fixed-length cell by said analyzing unit results in finding said fixed-length cell sent from an inappropriate sender and regulates transferring said fixed-length cell to said automatic routing selection switch when analyzing said receiver information regarding said fixed-length cell by said analyzing unit results in finding said fixed-length cell sent from an inappropriate receiver.

12. The switched multi-megabit digital service switching apparatus according to claim 4, further comprising a transfer regulating unit that regulates transferring said fixed-length cell to said automatic routing selection switch when analyzing said sender information regarding said fixed-length cell by said analyzing unit results in finding said fixed-length cell sent from an inappropriate sender and regulates transferring said fixed-length cell to said automatic routing selection switch when analyzing said receiver information regarding said fixed-length cell by said analyzing unit results in finding said fixed-length cell sent from an inappropriate receiver.

13. The switched multi-megabit digital service switching apparatus according to claim 5, further comprising a transfer regulating unit that regulates transferring said fixed-length cell to said automatic routing selection switch when said fixed-length cell is one sent from an inappropriate sender or sent to an inappropriate receiver, based on information stored in said routing table, said routing table registering inappropriate sender information and inappropriate receiver information each corresponding to receiver information regarding said fixed-length cell.

14. The switched multi-megabit digital service switching apparatus according to claim 6, further comprising a transfer regulating unit that regulates transferring said fixed-length cell to said automatic routing selection switch when said fixed-length cell is one sent from an inappropriate sender or sent to an inappropriate receiver, based on information stored in said routing table, said routing table registering inappropriate sender information and inappropriate receiver information each corresponding to receiver information regarding said fixed-length cell.

15. The switched multi-megabit digital service switching apparatus according to claim 7, further comprising a transfer regulating unit that regulates transferring said fixed-length cell to said automatic routing selection switch when said fixed-length cell is one sent from an inappropriate sender or sent to an inappropriate receiver, based on information stored in said routing table, said routing table registering inappropriate sender information and inappropriate receiver information each corresponding to receiver information regarding said fixed-length cell.

16. The switched multi-megabit digital service switching apparatus according to claim 8, further comprising a transfer regulating unit that regulates transferring said fixed-length cell to said automatic routing selection switch when said fixed-length cell is one sent from an inappropriate sender or sent to an inappropriate receiver, based on information stored in said routing table, said routing table registering inappropriate sender information and inappropriate receiver information each corresponding to receiver information regarding said fixed-length cell.

17. The switched multi-megabit digital service switching apparatus according to claim 5, wherein said routing table in said analyzing unit stores only information as routing information regarding receivers accommodated by said analyzing unit.

18. The switched multi-megabit digital service switching apparatus according to claim 6, wherein said routing table in said analyzing unit stores only information as routing information regarding receivers accommodated by said analyzing unit.

19. The switched multi-megabit digital service switching apparatus according to claim 7, wherein said routing table in said analyzing unit stores only information as routing information regarding receivers accommodated by said analyzing unit.

20. The switched multi-megabit digital service switching apparatus according to claim 8, wherein said routing table in said analyzing unit stores only information as routing information regarding receivers accommodated by said analyzing unit.

\* \* \* \* \*